(12) United States Patent
Even et al.

(10) Patent No.: US 12,377,971 B2
(45) Date of Patent: Aug. 5, 2025

(54) DRIVE UNIT WITH GEAR MECHANISM AND ELECTRIC DRIVE FOR A MAIN ROTOR OF A ROTARY WING CRAFT

(71) Applicant: kopter group ag, Mollis (CH)

(72) Inventors: Detlev Matthias Even, Kailua, HI (US); Johann Werner Hettenkofer, Ottobrunn (DE); Andreas Dummel, Hohenbrunn (DE); Andreas Löwenstein, Wetzikon (CH)

(73) Assignee: Kopter Group AG (CH)

( * ) Notice: Subject to any disclaimer, the term of this patent is extended or adjusted under 35 U.S.C. 154(b) by 610 days.

(21) Appl. No.: 17/429,194

(22) PCT Filed: Feb. 3, 2020

(86) PCT No.: PCT/EP2020/052589
§ 371 (c)(1),
(2) Date: Aug. 6, 2021

(87) PCT Pub. No.: WO2020/161061
PCT Pub. Date: Aug. 13, 2020

(65) Prior Publication Data
US 2022/0048615 A1  Feb. 17, 2022

(30) Foreign Application Priority Data
Feb. 7, 2019 (CH) .................................... 00154/19

(51) Int. Cl.
*B64C 27/12* (2006.01)
*B60L 50/60* (2019.01)
(Continued)

(52) U.S. Cl.
CPC .............. *B64C 27/12* (2013.01); *B60L 50/60* (2019.02); *B64D 27/24* (2013.01); *H02K 7/116* (2013.01);
(Continued)

(58) Field of Classification Search
CPC ...................................................... B64C 27/12
See application file for complete search history.

(56) References Cited

U.S. PATENT DOCUMENTS

| | | |
|---|---|---|
| 4,554,989 A | 11/1985 | Gruich et al. |
| 9,797,504 B2 | 10/2017 | Hidding et al. |
| (Continued) | | |

FOREIGN PATENT DOCUMENTS

| | | |
|---|---|---|
| CN | 107178426 A | 9/2017 |
| CN | 108 082 499 A | 5/2018 |
| (Continued) | | |

OTHER PUBLICATIONS

International Search Report and Written Opinion for PCT/EP2020/052589 filed Feb. 3, 2020.
(Continued)

*Primary Examiner* — Arfan Y. Sinaki
(74) *Attorney, Agent, or Firm* — Lerner David LLP

(57) ABSTRACT

A drive unit, particularly for the main rotor of a rotary wing aircraft, comprises: a planetary gear mechanism including a plurality of planetary gears. Each planetary gear has at least one planet wheel with toothing and the planetary gears are arranged concentrically to a central axis inside the planetary gear mechanism so that a rotatable shaft, in particular a rotor shaft of the rotary wing aircraft, can be driven by the planetary gears or the sun wheel. A compact and simplified drive unit can be provided in a very wide range of fields of use, particularly for driving a main rotor of a rotary wing aircraft. This can be achieved in that a first drive, particularly an electric drive, is integrated into at least one planetary gear, comprising a planet wheel and a planet wheel carrier, to form a first drive unit, so that the shaft can be set rotating by the first drive.

14 Claims, 11 Drawing Sheets

(51) Int. Cl.
*B64D 27/02* (2006.01)
*B64D 27/24* (2024.01)
*H02K 7/116* (2006.01)
*H02K 11/00* (2016.01)

(52) U.S. Cl.
CPC ...... *H02K 11/0094* (2013.01); *B60L 2200/10* (2013.01); *B64D 27/026* (2024.01)

(56) References Cited

U.S. PATENT DOCUMENTS

| | | | |
|---|---|---|---|
| 11,021,234 B1* | 6/2021 | Gornall | F16H 1/46 |
| 2004/0209722 A1* | 10/2004 | Ai | F16H 3/727 |
| | | | 475/5 |
| 2007/0095583 A1* | 5/2007 | Lee | B60K 17/16 |
| | | | 903/915 |
| 2012/0156034 A1* | 6/2012 | Sabannavar | F03D 15/00 |
| | | | 416/61 |
| 2012/0329593 A1 | 12/2012 | Larrabee et al. | |
| 2019/0214884 A1* | 7/2019 | Palmer | F02K 3/06 |

FOREIGN PATENT DOCUMENTS

| | | |
|---|---|---|
| CN | 108082468 A | 5/2018 |
| CN | 108 215 765 A | 6/2018 |
| CN | 108 773 263 A | 11/2018 |
| RU | 2547938 C2 | 4/2015 |
| RU | 2478849 C2 | 4/2018 |
| WO | 2011/127389 A2 | 10/2011 |

OTHER PUBLICATIONS

International Preliminary Report on Patentability, dated Aug. 10, 2021, with Written Opinion for PCT/EP2020/052589 filed Feb. 3, 2020 (English translation).
CN 108082499 A Machine Language English Translation.
CN 108773263 A Machine Language English Translation.
CN 108215765 A Machine Language English Translation.
RU 2547938 C2 Machine Language English Translation.
RU 2478849 C2 Machine Language English Translation.
CN 107178426 A Machine Language English Translation.
CN 108082468 A Machine Language English Translation (Abstract).
Chinese Search report Machine Language English Translation.

* cited by examiner

Legend:

EM: Electric Machine (Ring Torque Motor)
P(+): Plus-Pole of Main Power Supply Bar
P(-): Minus-Pole of Main Power Supply Bar

DRIVE UNIT WITH GEAR MECHANISM AND ELECTRIC DRIVE FOR A MAIN ROTOR OF A ROTARY WING CRAFT

TECHNICAL FIELD

The present invention describes a drive unit, particularly for driving the main rotor of a rotary wing aircraft.

Furthermore, the present invention describes a hybrid drive with the drive unit according to the invention, particularly for driving the main rotor of a rotary wing aircraft, and a rotary wing aircraft comprising the hybrid drive or the drive unit.

BACKGROUND

Drive units are known from the prior art in a very wide range of fields of use of drive technology or energy generation. Drive units of this type often comprise what are known as planetary gear mechanisms or related, comparable gear mechanisms.

By definition, planetary gear mechanisms are what are known as epicyclic gear mechanisms (because the planetary gears run around a sun wheel), which essentially comprise a centrally arranged sun wheel, at least one, mostly a plurality of planet wheels, planetary carriers belonging to the planet wheels, and an external, internally toothed annulus or an external, internally toothed annular gear. The advantages when using planetary gear mechanisms lie in the varied transmission options and in an even and distributed force transmission.

Planetary gear mechanisms are used in drive units in various technical fields, such as for example in wind turbines, in vehicle manufacture or in automobiles, in maritime propulsion systems, in aviation, etc.

For example, the use of a planetary gear mechanism for a wind turbine is known from the document U.S. Pat. No. 9,797,504 B2. During the rotation of the rotor shaft of the wind turbine caused by the wind (or driven by the wind), a transmission or conversion is achieved by the planetary gear mechanism from a low rotational speed and high torque at the rotor shaft to a high rotational speed and low torque at the generator.

In the case of rotary wing aircraft, particularly in the field of helicopters, the drive unit often comprises a helicopter gear mechanism or main rotor gear mechanism, which is configured as a planetary gear mechanism or related gear mechanism, for driving the main rotor. This type of helicopter gear mechanism has prevailed, as a reliable design is enabled as a result.

Such planetary gear mechanisms used in the field of drive technology have the disadvantage that the space requirement thereof is enormous and additionally may lead to an undesirably complex construction of a drive unit.

SUMMARY OF THE INVENTION

One aspect of the present invention relates to a compact and simplified drive unit in the widest range of fields of use, particularly for driving a main rotor of a rotary wing aircraft.

Embodiments of a drive unit, a hybrid drive and a rotary wing aircraft are disclosed herein.

According to the invention, a first drive, particularly an electric drive, is integrated into at least one planetary gear, as a result of which an inner drive is formed inside the planetary gear mechanism.

In the sense of the present invention, the at least one planetary gear itself is configured as a drive or essentially forms the first drive. As an important difference compared to the hitherto known use of planetary gear mechanisms (for example from U.S. Pat. No. 9,797,504 B2), it may be mentioned that according to the present invention, the planetary gear mechanism can, in a novel manner, function as a drive unit (owing to the at least one planetary gear configured as a drive) or an inner drive is formed inside the planetary gear mechanism.

In the sense of the present invention, only one single planetary gear can function or be configured as a drive, wherein all planetary gears preferably function as a drive for optimum power distribution. Particularly preferably, the drive unit according to the invention therefore comprises a control unit which is configured in such a manner in order to synchronize the drives integrated in the planetary gears with one another. Furthermore, these drives which are integrated in the planetary gears may be configured to be mechanically, electrically or hydraulically decouplable from one another by means of a suitable coupling in each case, in order to prevent a possible jamming of the gear mechanism due to a malfunction of one or more drives. In the sense of the present invention, the control is realized as a standard control for electric synchronous motors with control logic and power electronics unit (also termed "inverter"). The control logic (motor controller) produces the corresponding signals, which control the inverter, which then excites the corresponding motor coils of the synchronous motor, in order to obtain continuous rotation with defined rotational speed and torque. The synchronization of the electric synchronous motors is enabled by determining the position and the rotational speed of the armature and for each electric synchronous motor individually by calculating the control signals. In this sense, FIG. 6 shows a suitable overview.

According to a preferred development of the present invention, the drive unit may also comprise a single planet wheel carrier, i.e. a planet wheel carrier configured as a single coherent component, wherein the planet wheel carrier comprises at least one, preferably a multiplicity of mounting openings for the planetary gears.

Further advantageous embodiments are specified in the dependent patent claims.

Preferably the planet wheels are mounted in a fixed position such that they can rotate about their respective planet wheel axes, wherein the positionally fixed planet wheels are surrounded by an internally toothed annular gear which can rotate about the central axis of the drive unit and the annular gear can be rotated in such a manner that the shaft, particularly the rotor shaft, can be set rotating by means of an annular-gear driver which is fastened to the shaft, particularly rotor shaft. As a result, a related comparable form of a planetary gear mechanism is created. Such positionally fixed planet wheels have the advantage that the energy supply of the drive integrated into the planetary gears is facilitated by means of electrical supply lines.

However, also fundamentally conceivable in the context of the present invention is a planetary gear mechanism configured as an epicyclic gear mechanism, in which the planet wheels are not arranged in a fixed position, i.e. rotating around the sun wheel or running around the sun wheel. For example, according to such a preferred embodiment, the power supply of the drives integrated into the planet wheels could be realized by means of slip rings.

In principle, any desired configurations of the first drive integrated into the at least one planetary gear are conceivable, wherein the first drive may for example be a drive configured as a thermodynamic engine. The first drive is particularly preferably configured as a motor that can be regulated electrically with regards to rotational speed and torque, particularly as an electric synchronous motor with internal rotor part. In the sense of the present invention, a motor that can be regulated electrically with regards to rotational speed and torque may alternatively be understood to mean for example an asynchronous motor, reluctance motor, transverse flux motor or the like.

Alternatively, an outer rotor variant of an electric synchronous motor is additionally conceivable in the context of the invention, wherein the outer rotor of the electric synchronous motor is connected to the planet wheel in a rotationally fixed manner. For example, the outer rotor could be connected to a ring gear in such a rotationally fixed manner that planet wheel and outer rotor of the electric synchronous motor lie in the same plane and form a unit. In this sense, FIGS. 5a to 5d show a suitable overview.

Preferably, the first drive is an electric drive or an electric motor, wherein the at least one planetary gear comprises a stationary stator part, a rotatable rotor part, particularly inner rotor part, and the at least one planet wheel with an outer toothing fastened indirectly or directly on the rotor part and the planetary gear is held in an operatively connected manner with the sun wheel and/or the rotatable shaft by means of planetary carriers inside the planetary gear mechanism.

Particularly preferably, the planetary gear mechanism of the drive according to the invention comprises at least three planetary gears, more preferably three to six planetary gears. A stable structure of a planetary gear mechanism can be ensured by means of the use of at least three planetary gears. A modular structure is advantageously achieved by means of the use of more than three planetary gears and various power stages can be assembled with little outlay in terms of manufacturing technology. This has the further advantage that a high power requirement can be distributed on a plurality of stages with low electrical power due to the modular structure, as a result of which an advantage for the dissipation of the heat due to power loss of the motor and control results physically and in terms of manufacturing technology due to the resultant larger surface. In addition, an electric drive distributed over a plurality of stages even better protects against total failure of the whole drive if the second drive, which is configured as a thermodynamic engine, fails.

In principle, the drive unit according to the invention may comprise only at least one, preferably a multiplicity of first electric drives, in each case integrated into the planetary gears, and thus be constructed as a fully electric drive unit. A further aspect of the present invention relates however to a hybrid drive comprising the drive unit according to the invention, wherein the first, particularly electric, drive can be mechanically coupled to a second drive which is configured as a thermodynamic engine.

A further aspect of the present invention relates to a rotary wing aircraft comprising the drive unit according to the invention or the hybrid drive according to the invention.

Preferably, the at least one, preferably the multiplicity of first electric drives, particularly the electric synchronous motor with inner rotor part, is configured and dimensioned in such a manner that a main rotor and/or tail rotor of a rotary wing aircraft, particularly a helicopter, can be driven autonomously without an additional drive and thus a rotary wing aircraft with a fully electric drive unit is achieved. In the sense of the present invention, inter alia an autonomous electric drive is understood to mean a desired mechanical power can be output depending on the dimensioning. With regards to mechanical power of an autonomous electric drive, preferably at least one 150 KW, preferably 200 kW to 700 kW, more preferably 300 kW to 600 kW, very particularly preferably around 600 kW can be achieved. As an example, on the basis of an electric drive of around 600 kW mechanical power, at a low rotational speed of 371 rpm, a high torque of approx. 15,500 Nm or more can be achieved.

Preferably, the first, particularly electric, drive can be mechanically coupled to the second drive which is configured as a thermodynamic engine, particularly in that the central sun wheel can be driven by the second drive unit. Preferably, the second drive unit may be in mechanical operative connection with a second drive which is configured as a thermodynamic engine or else as a further electric drive, for example with an internal combustion engine, turbine motor, spark-ignition engine, diesel engine, fuel cell drive or the like. The at least one electric drive and the second drive are coupled via the planetary gear mechanism, so that the electric drive can support the second drive when driving the main rotor and/or tail rotor or vice versa and a hybrid drive is constructed as a result.

Preferably, the shaft or drive shaft of the drive unit according to the invention is a rotor shaft of the rotary wing aircraft according to the invention, wherein the rotor shaft is configured to be two-part and comprises a bearing mast and an outer mast, wherein the outer mast is configured as a hollow body and mounted rotatably about the central axis relative to the bearing mast, concentrically surrounding the bearing mast, and wherein the outer mast can be operatively connected to the helicopter rotor gear mechanism, which is configured as a planetary gear mechanism, wherein the bearing mast can be mounted in a fixed position and in a rotationally fixed manner in the rotary wing aircraft, so that the outer mast can be coupled to a main rotor in a rotationally fixed manner and can be set rotating using the helicopter rotor gear mechanism, which is configured as a planetary gear mechanism.

A particularly smooth-running drive of a main rotor can be achieved by means of such a two-part configuration of the drive shaft or the rotor shaft. Due to the division into bearing mast and outer mast, pressure is taken from the surrounding bearing, which the non-rotating part or the bearing mast then absorbs, so that a smooth-running drive results. Furthermore, it was advantageously found that during the driving of the main rotor, a slight rotational bending and as a result a lower fatigue arises than in the case of one-part drive shafts or rotor shafts. In addition, an extremely compact arrangement can be achieved, which, for example in a cavity of the bearing mast, allows the passing through of cabling, control rods for attaching a swash plate arranged above the rotor-blade coupling device, and further components from the drivetrain side to the rotor side. For example, the electrical supply lines for supplying electric power at the rotating system, such as for example anti-icing devices for the rotor blades, lamps in the rotor blades or electrical actuators for a "fly-by-wire" system can also be arranged here.

According to an alternative, preferred configuration of the rotary wing aircraft according to the invention, the shaft or rotor shaft of the rotary wing aircraft according to the invention may also be configured to be one-part and as a result offer other advantages, particularly in connection with a particularly simple and compact design.

Preferably, the drive shaft can be coupled in a rotationally fixed manner to a drive gear, wherein the drive gear can be rotatably mounted on the bearing mast by means of at least one radial bearing, and a rotation of at least one planet wheel (particularly a lower planet wheel in a two-stage gear mechanism) about a respective planet wheel axis on a side of a respective planet wheel carrier facing the sun wheel is achieved by means of the central sun wheel, which is connected to the drive gear in a rotationally fixed manner, and wherein at least one planet wheel (particularly the upper planet wheel assigned to the lower planet wheel in a two-stage gear mechanism) is surrounded by an internally toothed annular gear, which is rotatable about the central axis. The annular-gear driver, which functions as force-transmission device, can be attached or is attached or moulded on between the annular gear and the outer mast in such a manner that starting from a rotational movement of the drive gear, the outer mast and the main rotor, which is coupled to the outer mast in a rotationally fixed manner, can be set rotating.

Preferably, in the rotary wing aircraft according to the invention, the drive unit according to the invention comprises an electrical energy source, particularly a battery storage unit, wherein the first drive in the form of an electric drive of the hybrid drive according to the invention is in a rotationally-fixed coupled state between the electric drive and the second drive, which is configured as a thermodynamic engine, and during the operation of the second drive, the at least one, preferably the multiplicity of the first, electric drives can function as a generator for an additional energy recovery for the battery storage unit.

Preferably, in the rotary wing aircraft, particularly helicopter, according to the invention, a rectifier, particularly in the form of a blocking diode, is provided in the first electric drive, as a result of which the battery storage unit can be charged when the electric drive is not operating.

Preferably, in the rotary wing aircraft according to the invention, the logic of the control unit is configured in such a manner that the same further allows an automatic change of mode between torque generation for driving the rotor and additional energy recovery for the battery storage unit.

BRIEF DESCRIPTION OF THE DRAWINGS

Preferred exemplary embodiments of the subject matter of the invention are described in the following in connection with the attached drawings. In the figures.

DETAILED DESCRIPTION

Figure 1A:
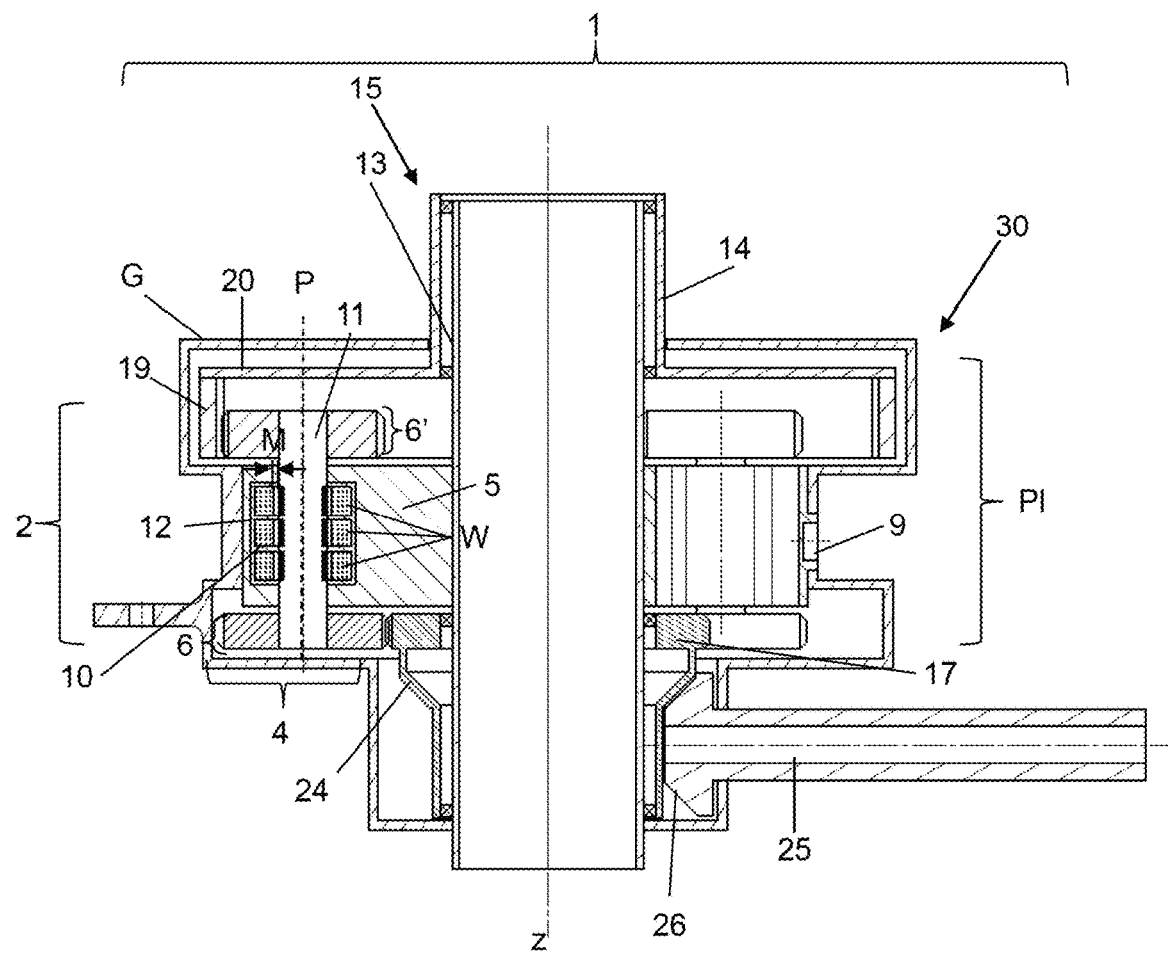
FIG. 1a shows a longitudinal section through a first preferred embodiment of the drive unit according to the invention, with a two-stage planetary gear mechanism as hybrid variant, particularly for driving the main rotor of a rotary wing aircraft.

FIG. 1a shows a longitudinal section along A-A (cf. FIG. 1b) through a first preferred embodiment of the drive unit 1 according to the invention with a multi-stage, here two-stage, planetary gear mechanism Pl, for example for driving a main rotor, which is not shown here, of a rotary wing aircraft (see FIG. 3 in particular in this regard).

The drive unit 1 according to the invention, which is here configured as a two-stage planetary gear mechanism Pl, comprises a central sun wheel 17 and a plurality of planetary gears 4 bearing against an outer toothing of the sun wheel 17, which is not shown here. The sun wheel 17 is surrounded by the bearing planetary gears 4, wherein the planetary gears 4 are arranged concentrically to the sun wheel 17 and a central axis z inside the planetary gear mechanism Pl. A planetary gear 4 here comprises a lower planet wheel 6, an upper planet wheel 6' and an inner rotor part 11 connecting the planet gears 6; 6' in a rotationally fixed manner to form two stages of the here two-stage planetary gear mechanism Pl, and a stator part 12.

The first preferred embodiment shown here has a shaft 15, which is configured to be two-part and comprises a bearing mast 13 and an outer mast 14. The main rotor of a rotary wing aircraft or a marine propeller or the like for example can be driven by means of the outer mast 14 or the shaft 15. The drive unit 1 according to the invention, which drives the shaft 15, can be applied in a very wide range of technical fields. In other words, the gear mechanism or planetary gear mechanism Pl of the drive unit according to the invention can also be understood as a torque transmitter gear mechanism 30.

At height or in the same axial position of the upper planet wheels 6', an annular gear 19 is arranged rotatably about the central axis z. The annular gear 19 surrounds all upper planet wheels 6', can be driven by the rotation of the upper planet wheels 6' and can therefore be rotated about the central axis z. An inner toothing, which is not shown here, is arranged on the annular gear 19, which is in engagement with an outer toothing (not shown here) of the upper planet wheels 6' (when realized in two-stage form, as shown here in FIG. 1a).

A mechanical operative connection between the upper planet wheels 6' and an outer mast 14, which can be rotated about the central axis z, is present for driving this outer mast 14 of the shaft 15. In the present, first preferred embodiment, this mechanical operative connection is realized on the basis of an annular-gear driver 20, which is connected to the outer mast 14 in a rotationally fixed manner. In other words, the annular-gear driver 20, which is likewise arranged on the annular gear 19, here functions as a force transmission unit, by means of which the rotation of the annular gear 19 can be transmitted to the rotatable outer mast 14.

As can be seen in FIG. 1a, a first electric drive 2, here in particular an electric synchronous motor 10 with inner rotor part 11, is integrated into at least one planetary gear 4 to form a first drive unit 1, so that the shaft 15 can be set rotating by the first drive 2. A stator part 12, which functions as stator of the synchronous motor 10, is substantially annular here and is provided with windings W, is here accommodated in the planet wheel carrier 5 and securely connected to the planet wheel carrier 5. The pin-shaped inner rotor part 11, which functions as rotor of the synchronous motor 10, is connected in a rotationally fixed manner to the upper and lower planet wheels 6; 6'. The planetary gear 4 is operatively connected to the sun wheel 17 and the rotatable shaft 15 inside the planetary gear mechanism Pl and held here in a fixed position by means of planet wheel carriers 5.

In the electric synchronous motor 10 shown in FIG. 1a, the force action of the synchronous motor 10 is created in the air gap or magnetic gap M between stator part 12 (stator) and inner rotor part 11 (rotor).

As can be seen in FIG. 1a, a sun wheel 17 constructed as a hollow shaft is connected to a drive gear 24, wherein the sun wheel 17 has an outer toothing which is not shown here. The sun wheel 17 and the drive gear 24 are attached to the bearing mast 13 rotatably about the central axis z. A rotation of the planet wheel 6' about a respective planet wheel axis P can be achieved by means of the sun wheel 17 via the lower planet wheel 6.

The drive gear 24 is in turn in operative connection with at least one drivetrain 25 by means of a drivetrain gear 26. Here, the drivetrain 25 is preferably in mechanical operative connection with a further drive, which is not shown here and is configured as a thermodynamic engine, to form a hybrid drive or a hybrid variant comprising the drive unit 1 according to the invention.

In the following, the use of the hybrid variant according to the first preferred embodiment of a drive unit 1 to drive the main rotor of a rotary wing aircraft is described by way of example (wherein the second to fifth preferred embodiments are equally suited to driving the main rotor of a rotary wing aircraft):

In this case, the torque transmitter gear mechanism 30 of the drive unit 1 according to the invention can here be understood as a main rotor gear mechanism or helicopter rotor gear mechanism of a rotary wing aircraft, which is configured as a planetary gear mechanism Pl here.

The shaft 15 or rotor shaft here is configured to be two-part, comprising a bearing mast 13 and an outer mast 14.

The helicopter rotor gear mechanism has a central cavity. The positionally fixed and rotationally fixed bearing mast 13 is mounted in this central cavity. The central axis z at the same time forms the longitudinal direction of the bearing mast 13 and an axis of rotation of the outer mast 14.

A mechanical operative connection between the here fixed planet wheels 6; 6', which are mounted rotatably about their planet wheel axis P, and a shaft 15 that can be rotated about the central axis z, i.e. comprising here a bearing mast 13 and a tubular outer mast 14 surrounding the bearing mast 13, is realized in that the positionally fixed upper planet wheels 6' are surrounded by an annular gear 19, which is rotatable about the central axis z and is internally toothed, and the annular gear 19 can be rotated in such a manner that the outer mast 14 of the shaft 15 can be set rotating by means of an annular-gear driver 20 fastened to the annular gear 19 and to the outer mast 14.

As can be seen in FIG. 1a, a first electric drive 2, here in particular an electric synchronous motor 10 with inner rotor part 11, is integrated into at least one planetary gear 4 to form a first drive unit 1, so that the outer mast 14 of the shaft 15 can be set rotating by the first drive 2. A stator part 12, which functions as the stator of the synchronous motor 10, is here accommodated in the planet wheel carrier 5 and securely connected to the planetary carrier, whilst the pin-shaped inner rotor part 11, which functions as rotor of the synchronous motor 10, is connected in a rotationally fixed manner to the upper and lower planet wheels 6; 6'.

The first preferred embodiment of the drive unit 1 according to the invention, which is shown in FIGS. 1a to 1d and is suitable for a rotary wing aircraft or helicopter, in particular has safety advantages in the context of this use. In an emergency, in the form of a failure of a drive of such a multi-engined helicopter, the helicopter should be able to rely for a predetermined period on the power from the other remaining engine, in order to set the helicopter in a safe flight regime and to react to the engine failure.

The first preferred embodiment of the drivetrain 25 shown in FIG. 1a is preferably also in mechanical operative connection with a further drive, which is not shown here and is configured as a thermodynamic engine, to form a hybrid drive. In this case, in addition to a second drive configured as a thermodynamic engine, additional mechanical work can be performed by a first, here electric, drive 2 and an associated electrical energy source. Such helicopters with a hybrid drive advantageously offer an additional safety advantage compared to twin-engined helicopters solely with fossil fuel supply, as for example in the event of the failure of the fossil fuel supply, recourse can be had to the additional electrical energy supply.

Due to the integration of the first drive 2, particularly the electric synchronous motor, into the planetary gears 4, a distinctly compact hybrid drive is achieved in a twin-engined helicopter (for example in the sense of a dissimilar helicopter).

As can be seen in FIG. 1*a*, here, the bearing mast is configured as a hollow body, so that components such as control rods for attaching a swash plate and/or cabling arranged above the rotor-blade coupling device can be arranged traversing the bearing mast 13 and the outer mast 14 in the direction of the central axis z. For example, the electrical supply lines for electrical power supply to the rotating system, such as anti-icing devices for the rotor blades, lamps in the rotor blades or electrical actuators for a 'fly-by-wire' system may also be arranged here.

From here and in the following, the same reference numerals designate the same components in the figures.

Figure 1B:
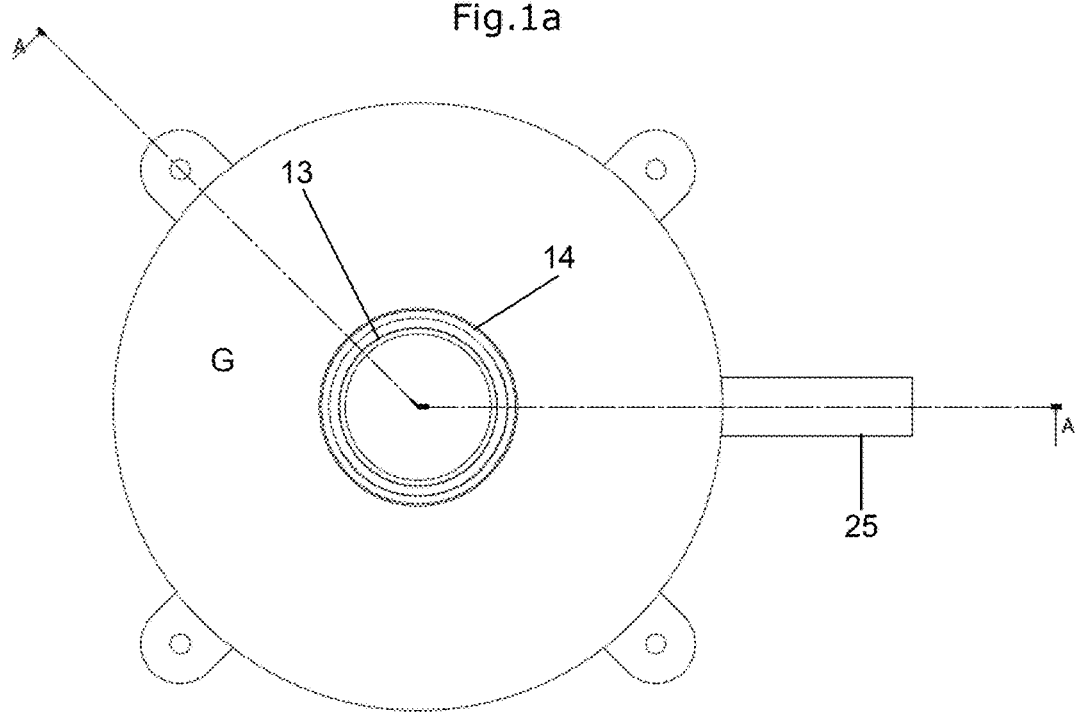
FIG. 1b shows a plan view of the first preferred embodiment of the drive unit according to the invention with attached gear mechanism housing.

FIG. 1*b* shows a plan view of the first preferred embodiment of the drive unit 1 according to the invention with attached gear mechanism housing G.

Figure 1C:
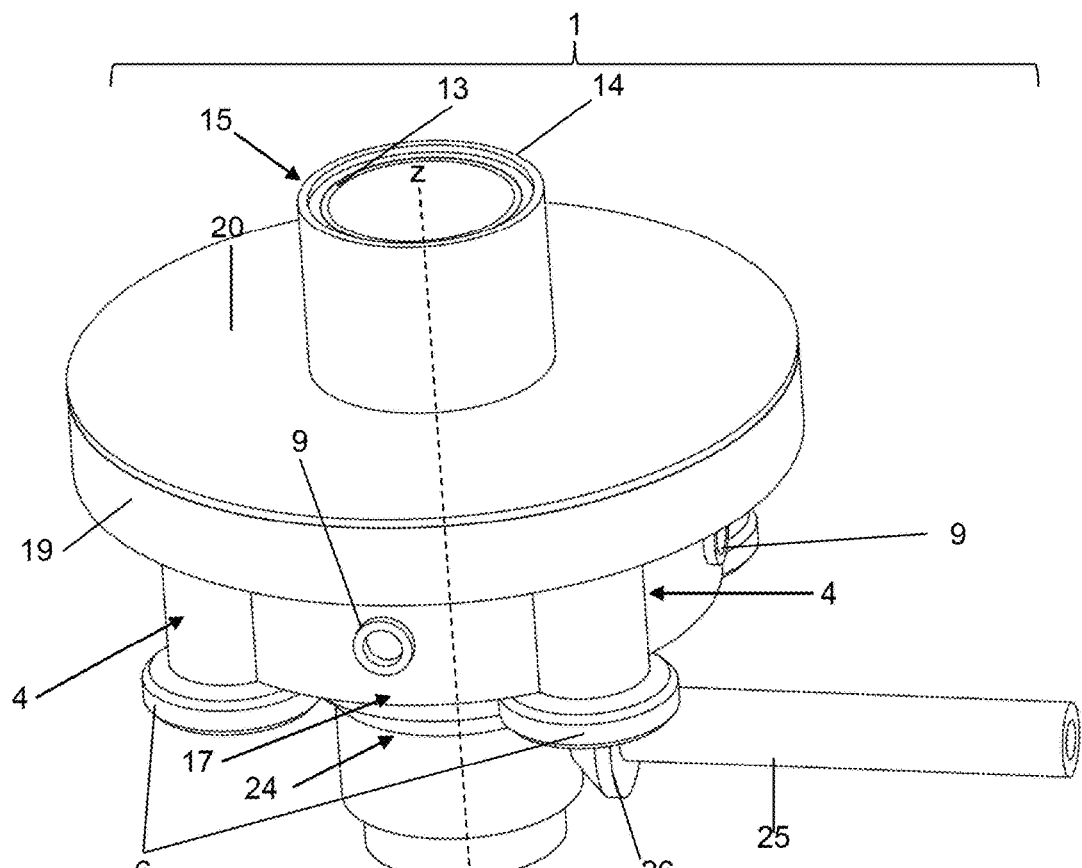
FIG. 1c shows a perspective view of the first preferred embodiment of the drive unit according to the invention without gear mechanism housing.

FIG. 1*c* shows a perspective view of the first preferred embodiment of the drive unit 1 according to the invention without or with removed housing. By way of example, the first preferred embodiment shown in FIG. 1*c* has four planetary gears 4.

Figure 1D:
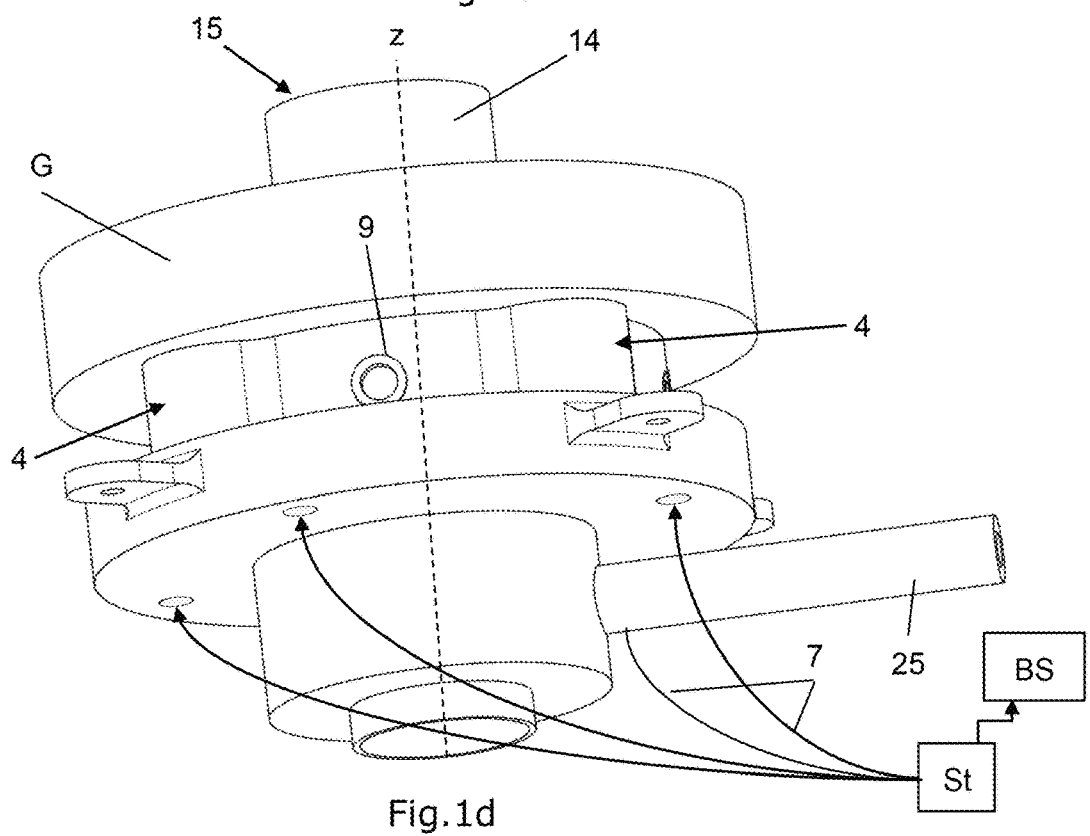
FIG. 1d shows a perspective view of the first preferred embodiment of the drive unit according to the invention with gear mechanism housing.

FIG. 1*d* shows a perspective view of the first preferred embodiment of the drive unit 1 according to the invention with a housing G. In this case, the drive unit 1 comprises a control unit, which is configured so as to synchronize the first drives 2 integrated in the planetary gears 4 with one another. This synchronization of the first drives 2 integrated in the planetary gears 4 is explained more precisely in FIG. 6.

Furthermore, these drives 2 integrated in the planetary gears may be configured such that they can be decoupled from one another mechanically, electrically or hydraulically by means of a suitable coupling, which is not shown here, in order to prevent a possible jamming of the gear mechanism due to a malfunction of one or more drives.

Furthermore, here according to FIG. 1*d*, the drive unit 1 comprises an electrical energy source, particularly a battery storage unit BS shown here, and wherein the first drive 2 in the form of a, here electric, drive of the hybrid drive in a rotationally fixed coupled state between the first, here electric, drive 2 and the second drive, which is configured as a thermodynamic engine. During the operation of the second drive, the first, here electric, drive 2 can function as a generator and take care of an additional energy recovery for the battery storage unit BS.

A rectifier, particularly in the form of a blocking diode, is preferably provided in the first, in particular electric, drive 2, particularly the electric synchronous motor with inner rotor part 11, as a result of which the battery storage unit BS can be charged when the electric drive is not operating.

In addition, the control unit ST can furthermore be provided with a logic which enables an automatic change of mode between torque generation for driving the main rotor and the additional energy recovery for the battery storage unit BS.

The first preferred embodiment, which is shown in FIGS. 1*a* to 1*d*, in other words shows a hybrid variant comprising the drive unit 1 according to the invention. Owing to the design as a two-stage planetary gear mechanism Pl, an optimum higher transmission can be set up, whilst at the same time, the advantages of a hybrid drive (for example safety advantages when used in a rotary wing aircraft) are achieved.

According to a preferred development of the present invention, the planetary gear mechanism can also be configured as more than two-stage, e.g. three-stage, etc.

Figure 2A:
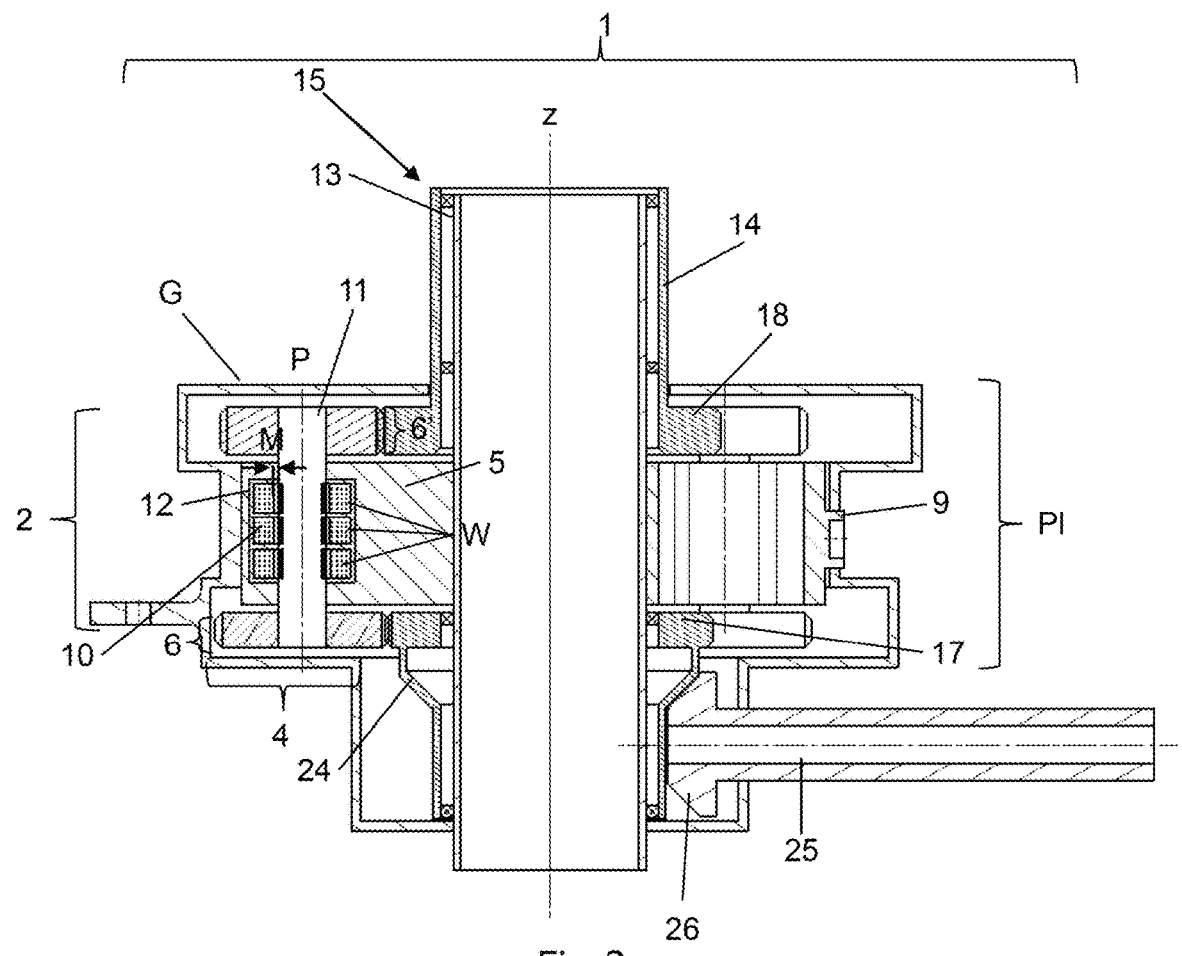
FIG. 2a shows a longitudinal section through a second preferred embodiment of the drive unit according to the invention, with a two-stage planetary gear mechanism as hybrid variant with an inner externally toothed annular gear.

FIG. 2*a* shows a longitudinal section along A-A (cf. FIG. 2*b*) through a second preferred embodiment of the drive unit 1 according to the invention with a two-stage planetary gear mechanism Pl as a hybrid variant with an inner externally toothed annular gear 18.

The drive unit 1 according to the invention, which is here configured as a two-stage planetary gear mechanism Pl, comprises a central sun wheel 17 and a plurality of planetary gears 4 surrounding the sun wheel 17, bearing against an outer toothing of the sun wheel 17, which is not shown here, wherein planetary gears 4 are arranged concentrically to the sun wheel 17 and a central axis z inside the planetary gear mechanism Pl.

As shown in FIG. 2*a*, an internal, externally toothed annular gear 18, which is connected in a rotationally fixed manner to the outer mast 14, is here surrounded by the upper planet wheels 6' and can likewise be driven by the rotation of the upper planet wheels 6', thus can be rotated about the central axis z and can be set rotating together with the outer mast 14. An outer toothing, which is not shown here, is arranged on the annular gear 18, which is in engagement with an outer toothing (not shown here) of the upper planet wheels 6'.

Figure 2B:
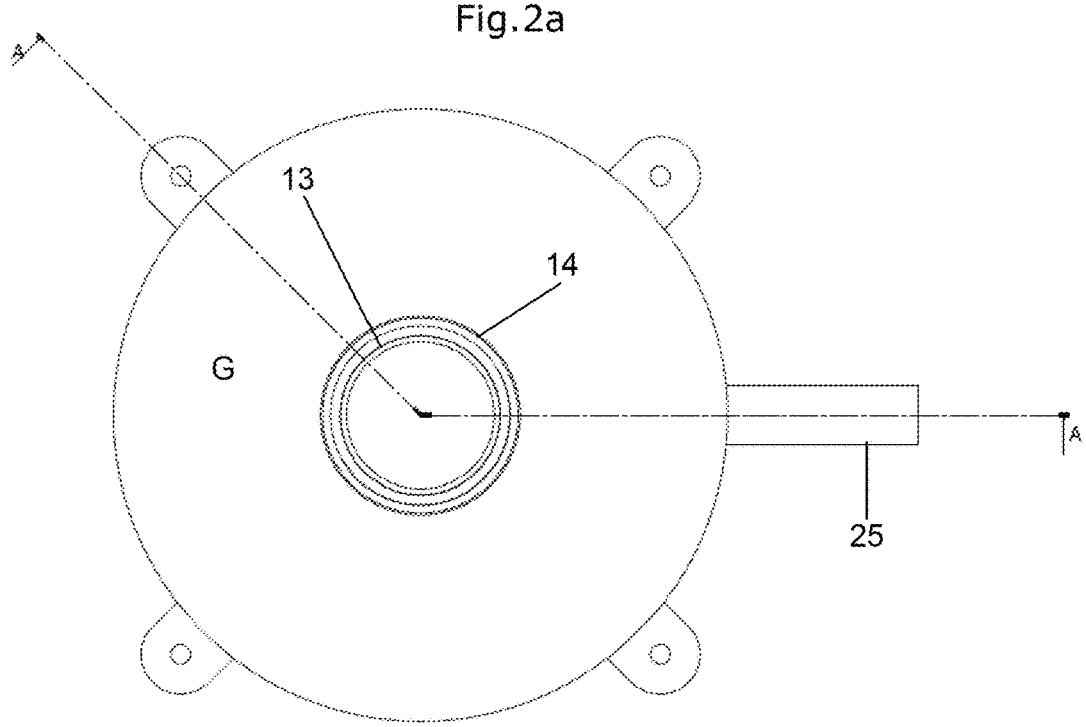
FIG. 2b shows a plan view of the second preferred embodiment of the drive unit according to the invention with attached gear mechanism housing.

FIG. 2*b* shows a plan view of the second preferred embodiment of the drive unit 1 according to the invention with attached gear mechanism housing G.

Figure 2C:
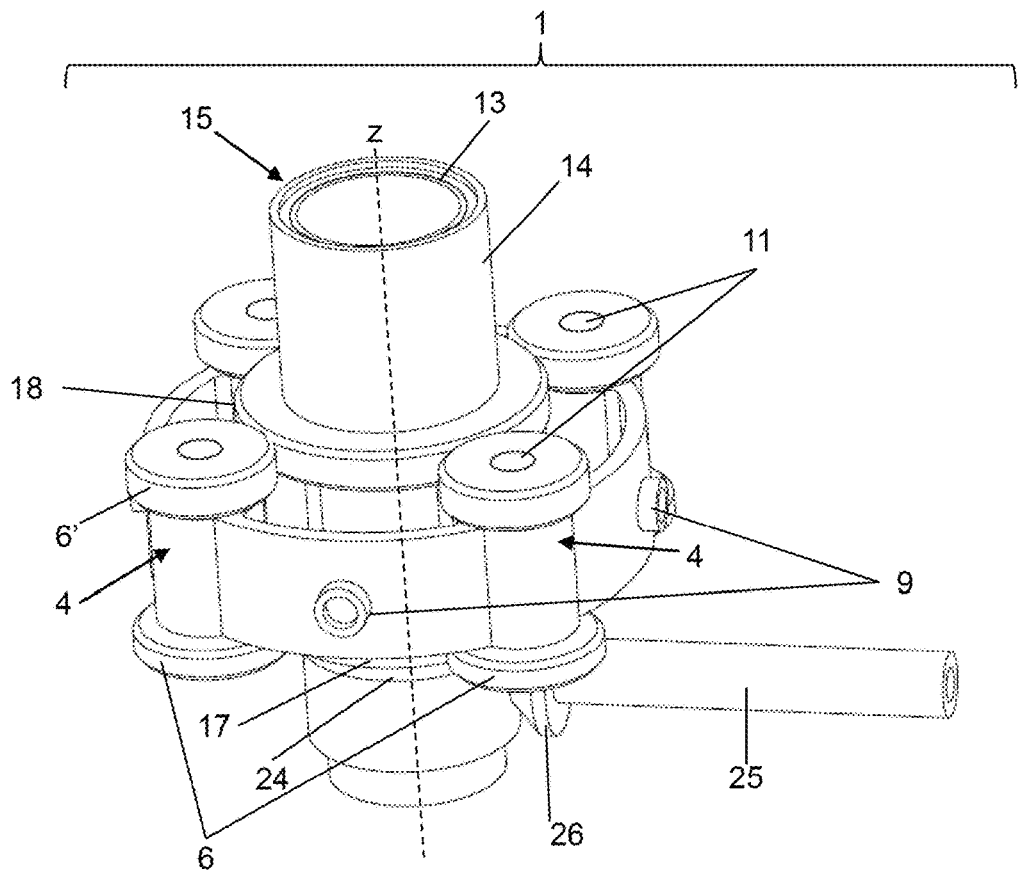
FIG. 2c shows a perspective view of the second preferred embodiment of the drive unit according to the invention without gear mechanism housing.

FIG. 2*c* shows a perspective view of the second preferred embodiment of the drive unit according to the invention without a gear mechanism housing.

Figure 2D:
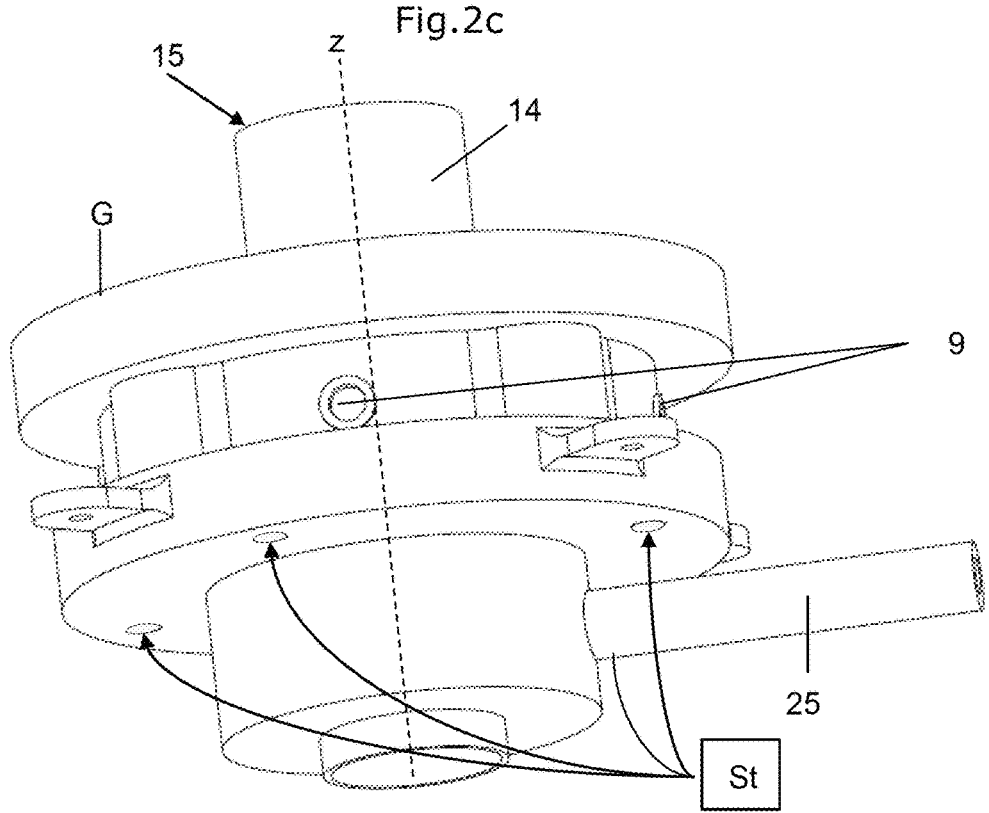
FIG. 2d shows a perspective view of the second preferred embodiment of the drive unit according to the invention with gear mechanism housing.

FIG. 2*d* shows a perspective view of the second preferred embodiment of the drive unit according to the invention with a gear mechanism housing G.

Figure 3A:
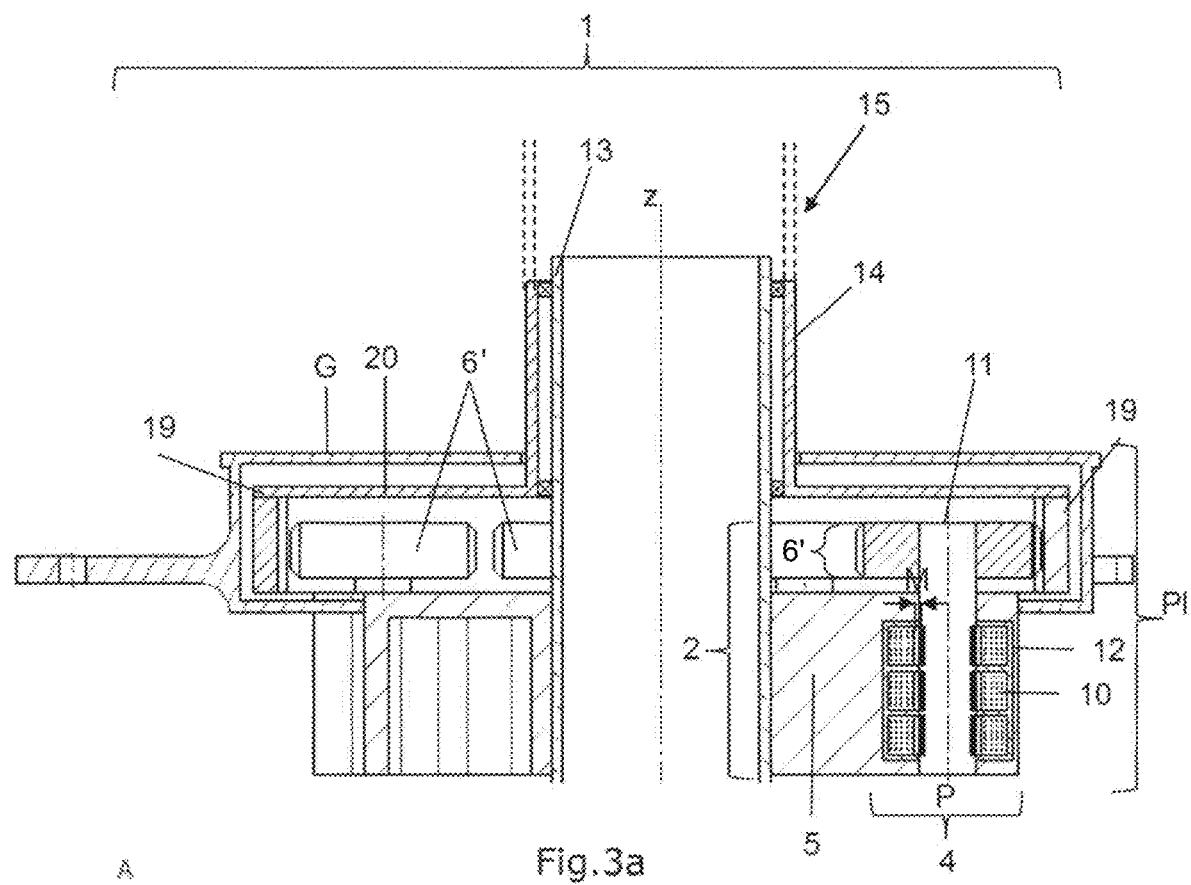
FIG. 3a shows a longitudinal section through a third preferred embodiment of the drive unit according to the invention, with a one-stage planetary gear mechanism as fully electric drive variant, particularly for driving the main rotor of a rotary wing aircraft.

FIG. 3*a* shows a longitudinal section along A-A (cf. FIG. 3*b*) through a third preferred embodiment of the drive unit 1 according to the invention with a one-stage planetary gear mechanism Pl, for example for driving a main rotor, which is not shown here, of a rotary wing aircraft.

As can be seen in FIG. 3*a*, in the third preferred embodiment shown here, it is possible to dispense with a sun wheel (as also in the fourth preferred embodiments shown in FIGS. 4*a* to 4*d* or in the fifth preferred embodiments shown in FIGS. 5*a* to 5*d*), which therefore corresponds to a gear mechanism related to a planetary gear mechanism Pl. This possible dispensation with a sun wheel has the advantage of a weight reduction and a reduction of the complexity.

The use of such a one-stage planetary gear mechanism Pl has the advantage that in the third preferred embodiment shown here, no external gear mechanism housing G extending over two stages has to be attached, and as a result, the first drive 2 integrated in the planetary gears 4, here configured as an electric synchronous motor 10 with inner rotor part 11, can be cooled better. In particular, up to a certain power value, the heat losses will be small enough to avoid a liquid cooling circuit, and therefore as a result, no liquid cooling is necessary, i.e. the available air cooling by means of the ambient air around the planetary gears 4 already effects a satisfactory cooling. In addition, it has been shown that in the case of a modular structure of the electric drive over a plurality of stages with low electrical power, the power values without required liquid cooling is higher than in the case of a single, electric drive.

Figure 3B:
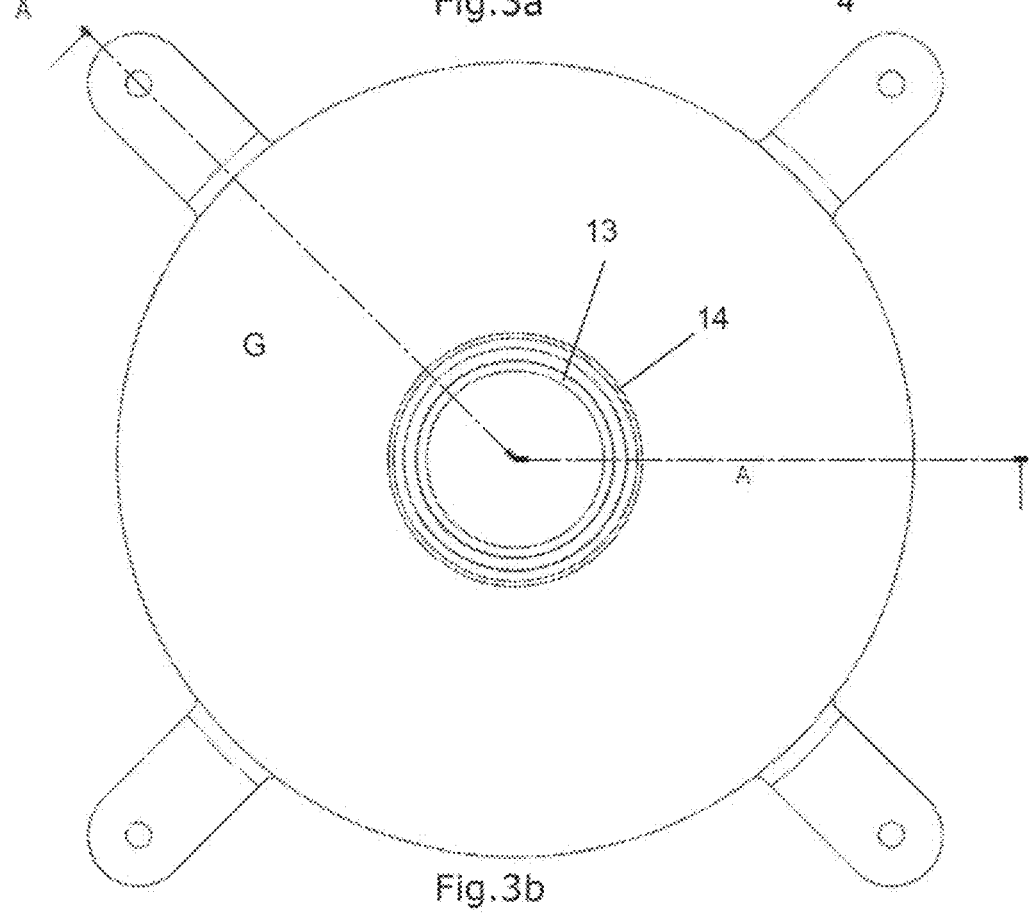
FIG. 3b shows a plan view of the third preferred embodiment of the drive unit according to the invention with attached gear mechanism housing.

FIG. 3*b* shows a plan view of the third preferred embodiment of the drive unit according to the invention with attached gear mechanism housing G.

Figure 3C:
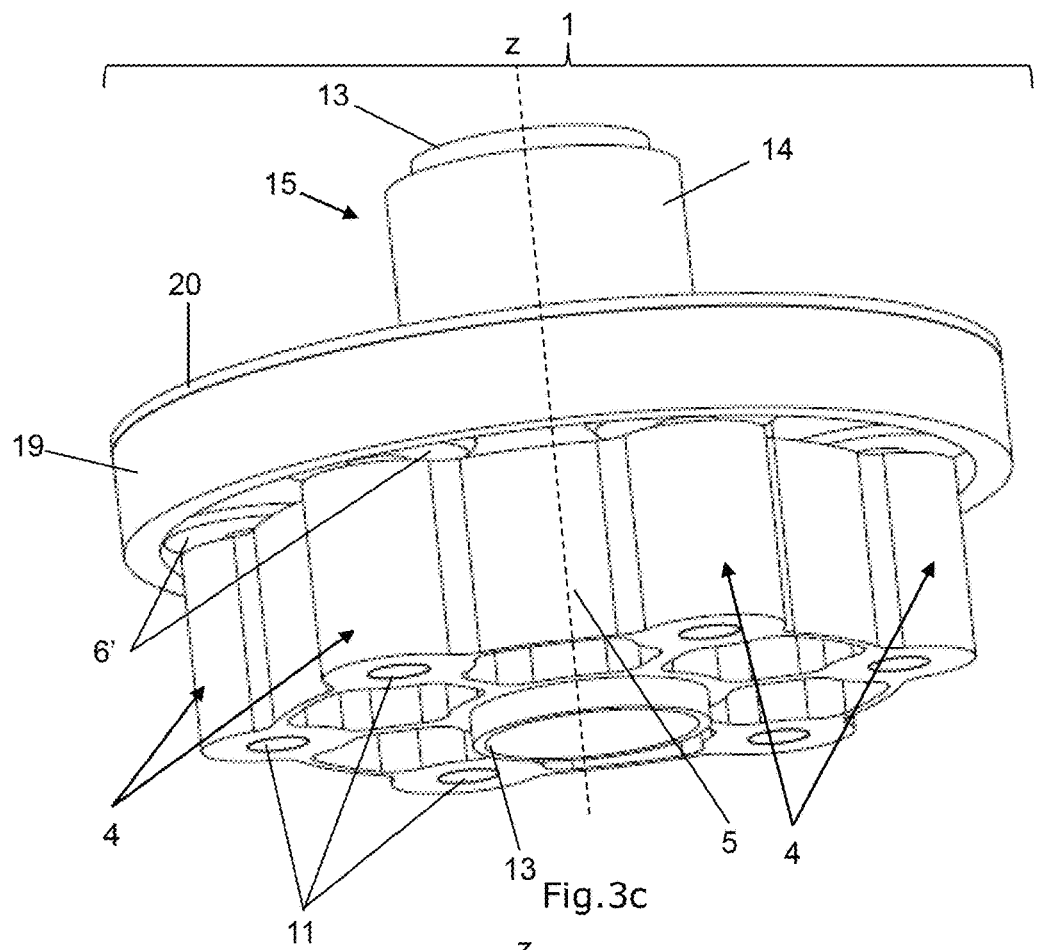
FIG. 3c shows a perspective view of the third preferred embodiment of the drive unit according to the invention without gear mechanism housing.

FIG. 3c shows a perspective view of the third preferred embodiment of the drive unit 1 according to the invention without or with removed housing. The third preferred embodiment shown here has six planetary gears 4 by way of example.

Figure 3D:
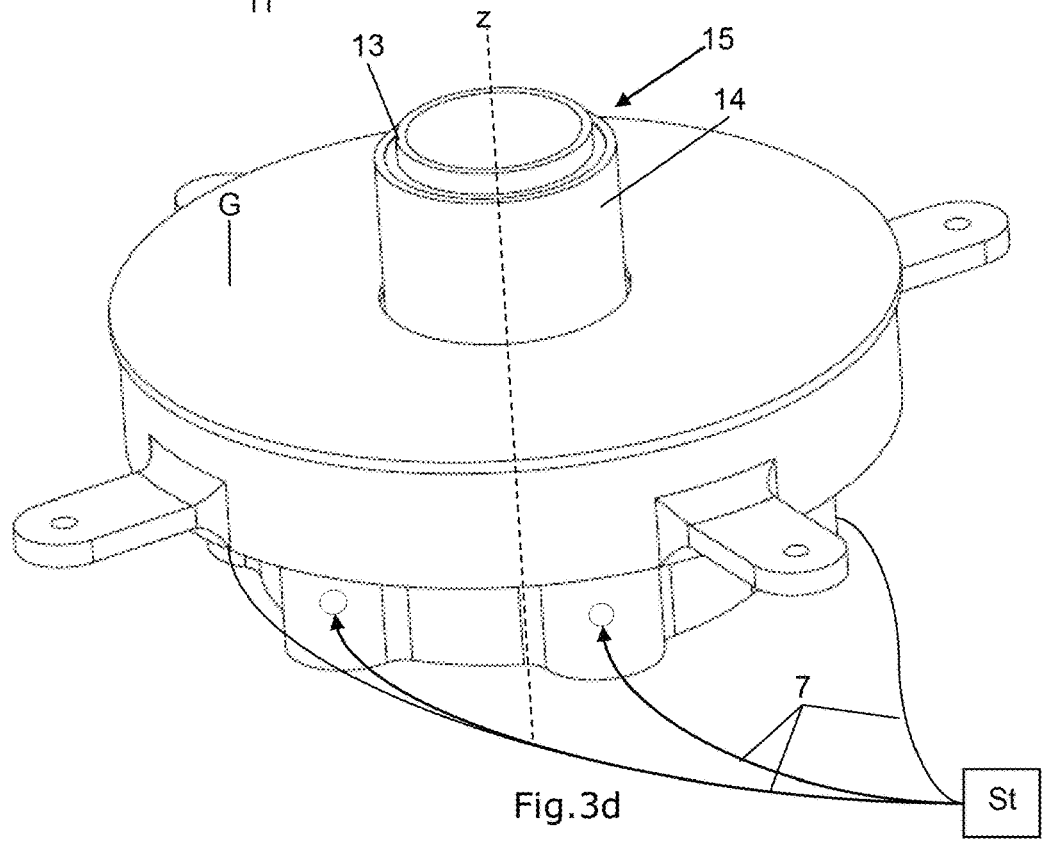
FIG. 3d shows a perspective view of the third preferred embodiment of the drive unit according to the invention with gear mechanism housing.

FIG. 3d shows a perspective view of the third preferred embodiment of the drive unit 1 according to the invention with gear mechanism housing G.

FIGS. 3a to 3d relating to the third preferred embodiment with a one-stage planetary gear mechanism Pl show a fully electric variant of the drive unit 1 according to the invention, wherein a hybrid variant comprising a drive unit 1 configured as a one-stage planetary gear mechanism Pl is likewise possible. A one-stage planetary gear mechanism Pl is understood to mean that the planetary gears 4 only comprise one upper planet wheel 6' and therefore only have one stage.

Fundamentally, an even simpler embodiment of the drive according to the invention is additionally conceivable, wherein the torque can be transmitted by an externally toothed annular gear 18 instead of by means of an internally toothed annular gear 19 (cf. FIGS. 2a to 2d or FIGS. 4a to 4d).

Figure 4A:
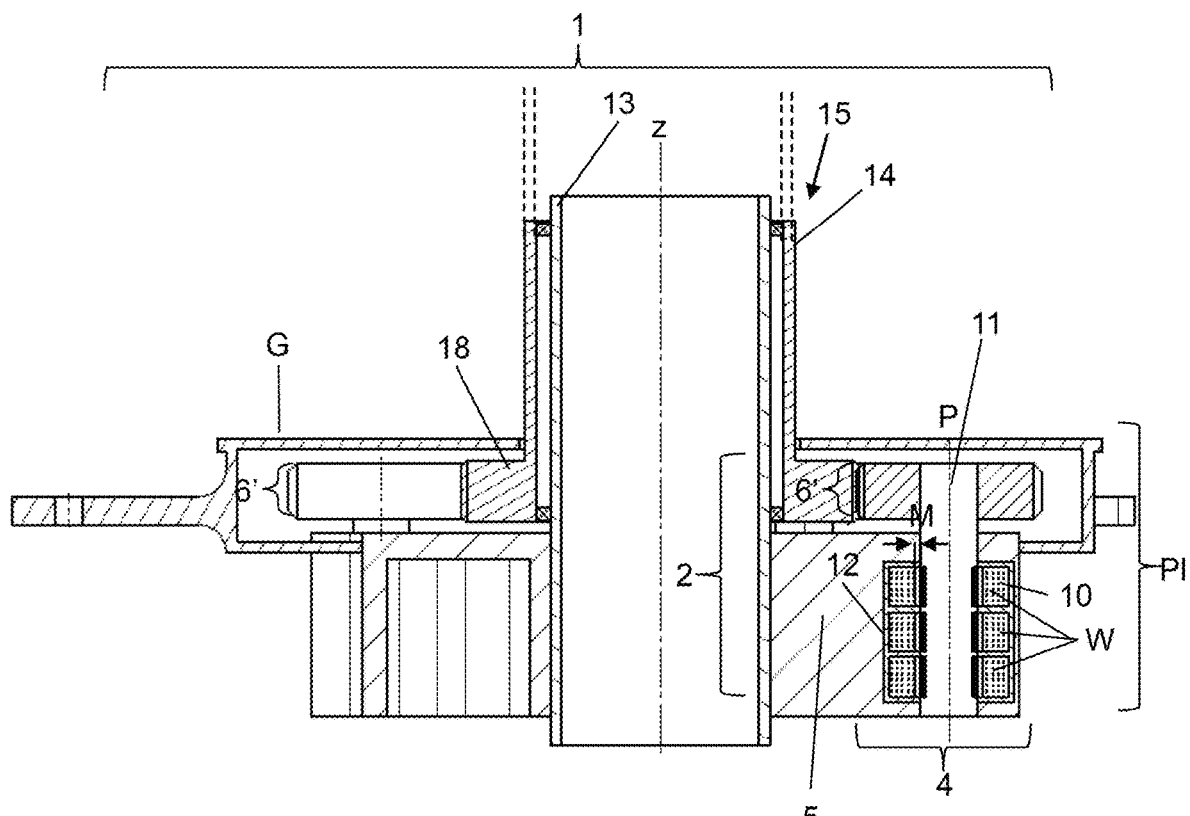
FIG. 4a shows a longitudinal section through a fourth preferred embodiment of the drive unit according to the invention, with a one-stage planetary gear mechanism as fully electric drive variant and with an inner externally toothed annular gear, particularly for driving the main rotor of a rotary wing aircraft.

FIG. 4a shows a longitudinal section through a fourth preferred embodiment of the drive unit 1 according to the invention with a one-stage planetary gear mechanism constructed as a fully electric drive variant and with an inner, externally toothed annular gear, particularly for driving the main rotor of a rotary wing aircraft.

As shown in FIG. 4a, an internal, externally toothed annular gear 18, which is connected in a rotationally fixed manner to the outer mast 14, is here surrounded by the upper planet wheels 6' and can likewise be driven by the rotation of the upper planet wheels 6' and together with the outer mast 14 about the central axis z.

Figure 4B:
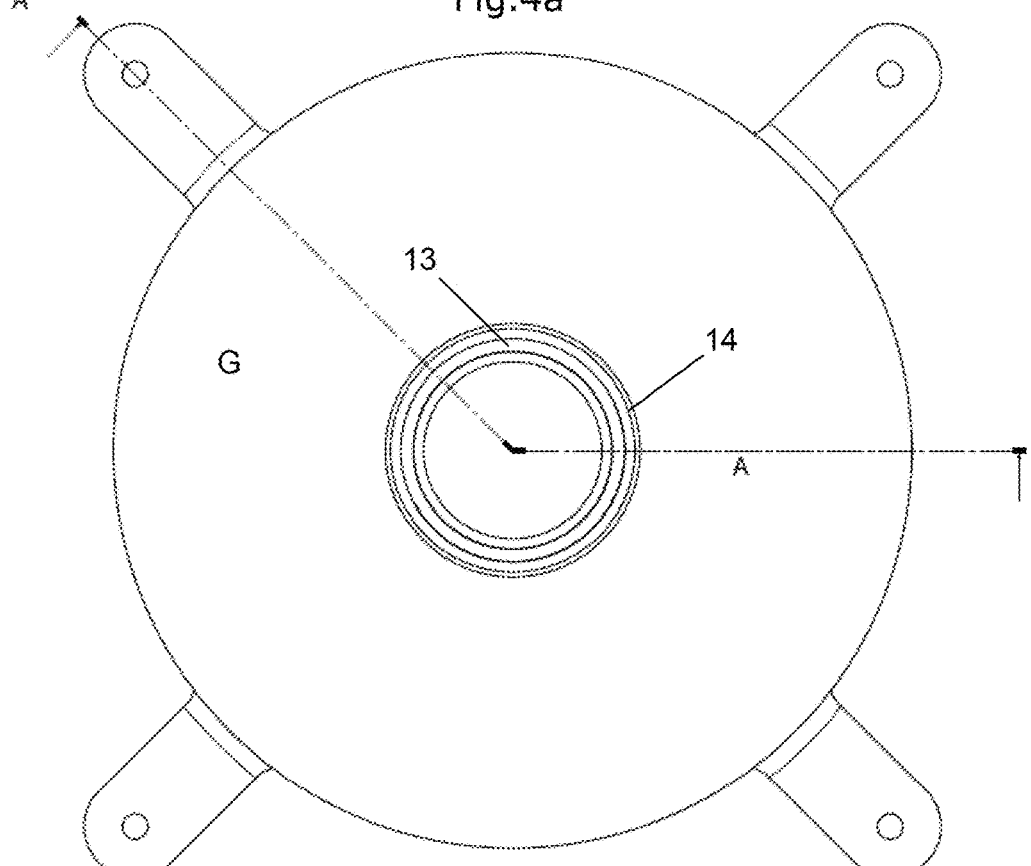
FIG. 4b shows a plan view of the fourth preferred embodiment of the drive unit according to the invention with attached gear mechanism housing.

FIG. 4b shows a plan view of the fourth preferred embodiment of the drive unit according to the invention with attached gear mechanism housing G.

Figure 4C:
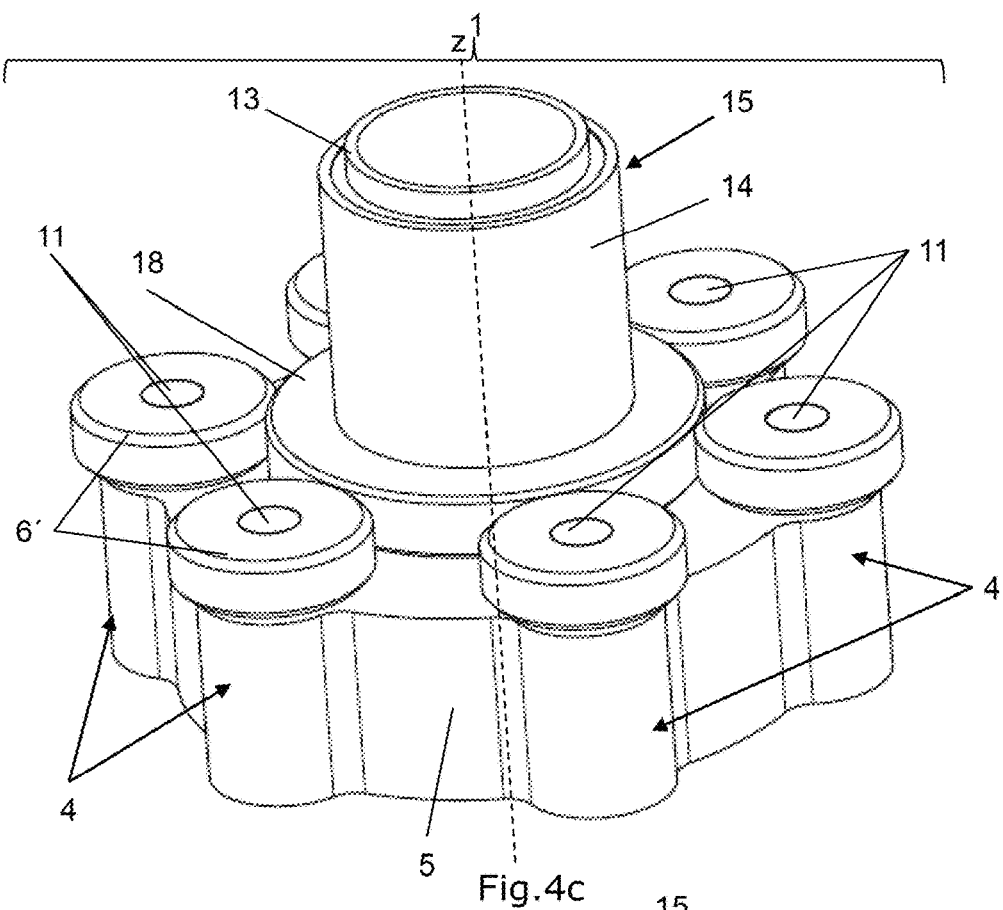
FIG. 4c shows a perspective view of the fourth preferred embodiment of the drive unit according to the invention without gear mechanism housing.

FIG. 4c shows a perspective view of the fourth preferred embodiment of the drive unit according to the invention without a gear mechanism housing.

Figure 4D:
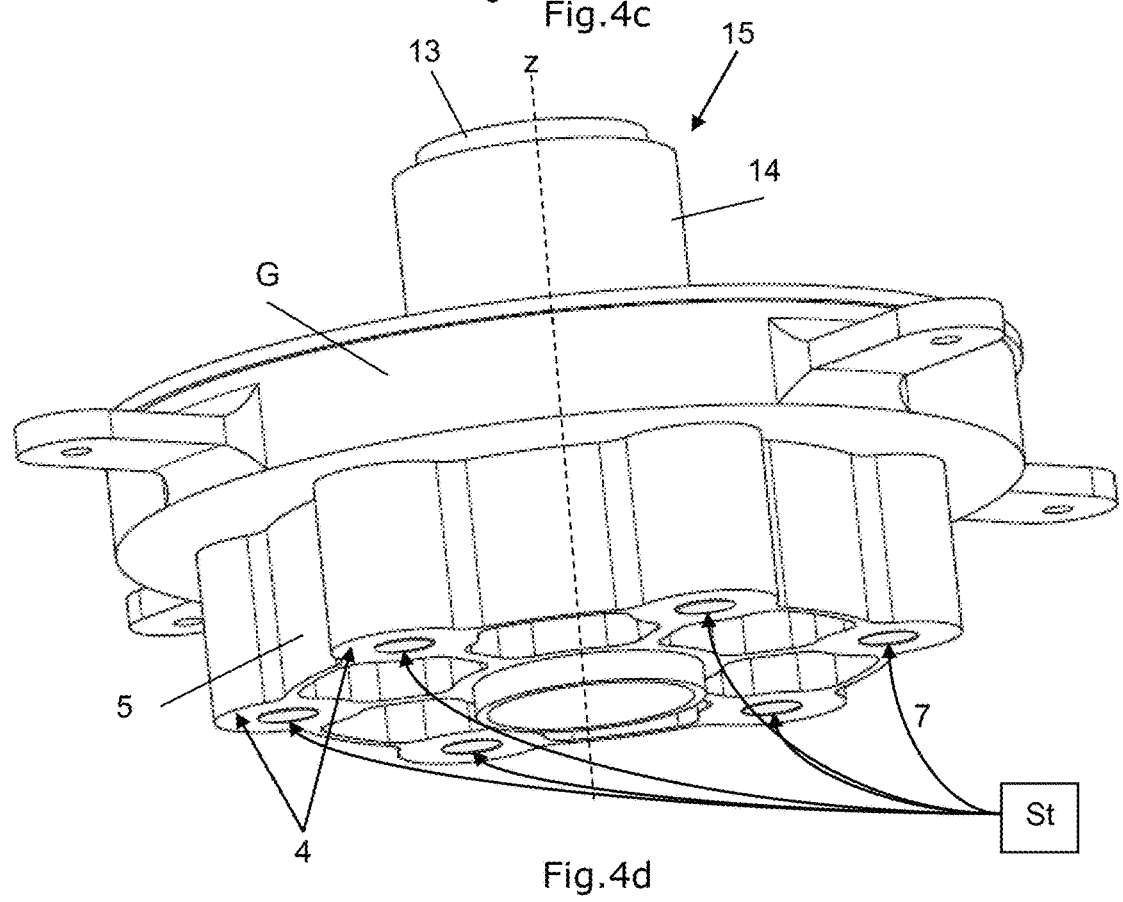
FIG. 4d shows a perspective view of the fourth preferred embodiment of the drive unit according to the invention with gear mechanism housing.

FIG. 4d shows a perspective view of the fourth preferred embodiment of the drive unit according to the invention with a gear mechanism housing G.

Figure 5A:
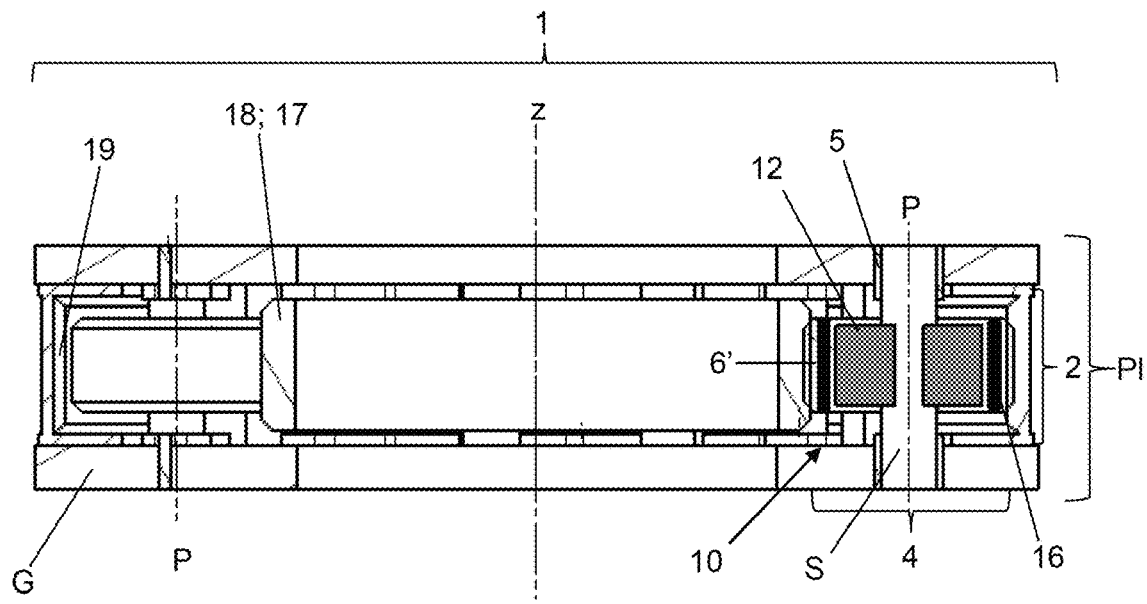
FIG. 5a shows a longitudinal section through a fifth preferred embodiment of the drive unit according to the invention, with a one-stage planetary gear mechanism as fully electric drive variant and as outer rotor variant.

FIG. 5a shows a longitudinal section along A-A (cf. FIG. 5b) through a fifth preferred embodiment of the drive unit 1 according to the invention with a one-stage planetary gear mechanism Pl as a fully electric drive variant and as an outer rotor variant.

As can be seen in FIG. 5a, a first, here electric, drive 2, here in particular an electric synchronous motor 10 with outer rotor part 16, is integrated into at least one planetary gear 4 to form a first drive unit 1.

A stationary stator part 12, which functions as stator of the synchronous motor 10, is substantially annular here and is provided with windings W, is here accommodated in a pin-shaped element S and securely connected to the pin-shaped element S, whilst the outer rotor part 16 of the synchronous motor, which here functions as a rotor of the synchronous motor 10, is here connected to the planet wheel 6 in a rotationally fixed manner. The planet wheel 6 and the outer rotor part 16 of the electric synchronous motor 10 here lie in the same plane or in the same axial position and essentially form one unit.

Figure 5B:
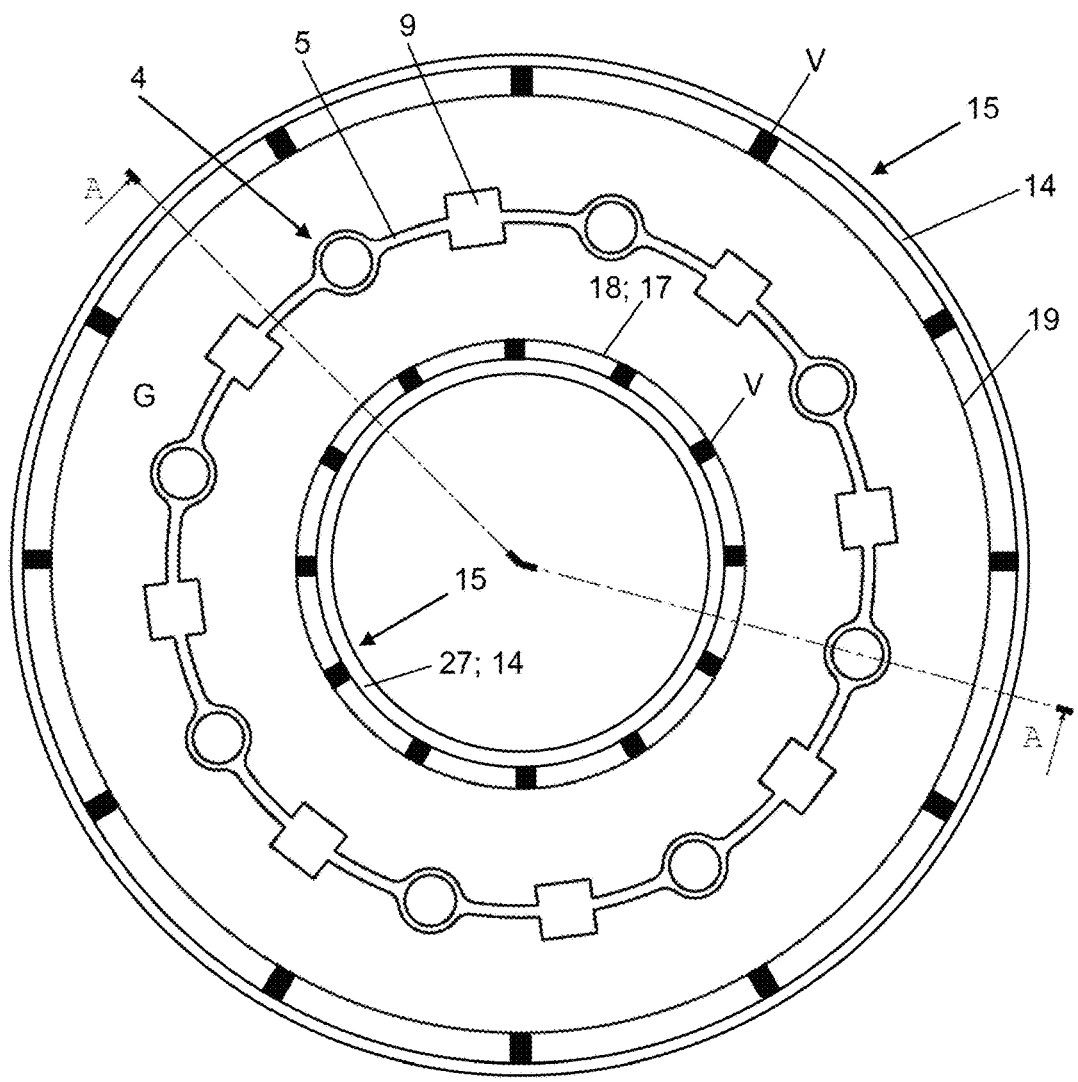
FIG. 5b shows a plan view of the fifth preferred embodiment of the drive unit according to the invention with attached gear mechanism housing.

As can be seen in FIG. 5a, here, on one side, the positionally fixed planet wheels 6' of the planetary gears 4 are surrounded by an internally toothed annular gear 19 that can be rotated about the central axis z and on the other side, an inner externally toothed annular gear 18 is surrounded by the planet wheels 6', wherein an outer mast 14, which is not shown here, can be set rotating by means of the internally toothed annular gear 19 (cf. FIG. 5b) and a further central drive shaft, which is not shown here, can be set rotating by means of the inner externally toothed annular gear 18 (cf. FIG. 5b). In other words, on the basis of the fifth preferred embodiment, two shafts can be set rotating with different transmission. In addition, it is indicated in FIG. 5a, that in the case of a here likewise possible configuration of a hybrid variant, the externally toothed annular gear 18 can function as sun wheel 17.

FIG. 5b shows a plan view of the fifth preferred embodiment of the drive unit 1 according to the invention with attached gear mechanism housing G and in operative connection with an outer mast 14 or a central drive shaft 27. As can be seen in FIG. 5b, the internally toothed annular gear 19 may be in operative connection with the outer mast 14 or the shaft 15 via a multiplicity of connecting elements V. Alternatively or additionally, the externally toothed annular gear 18 or the sun wheel 17 may, in particular as a configuration of a hybrid variant, be in operative connection with a central drive shaft 27 via a multiplicity of connecting elements V.

Furthermore, it is indicated in FIG. 5b that in the case of the configuration as non hybrid variant or fully electric drive variant in the sense of a further preferred development, the inner externally toothed annular gear 18 may be in operative connection with the outer mast.

Figure 5C:
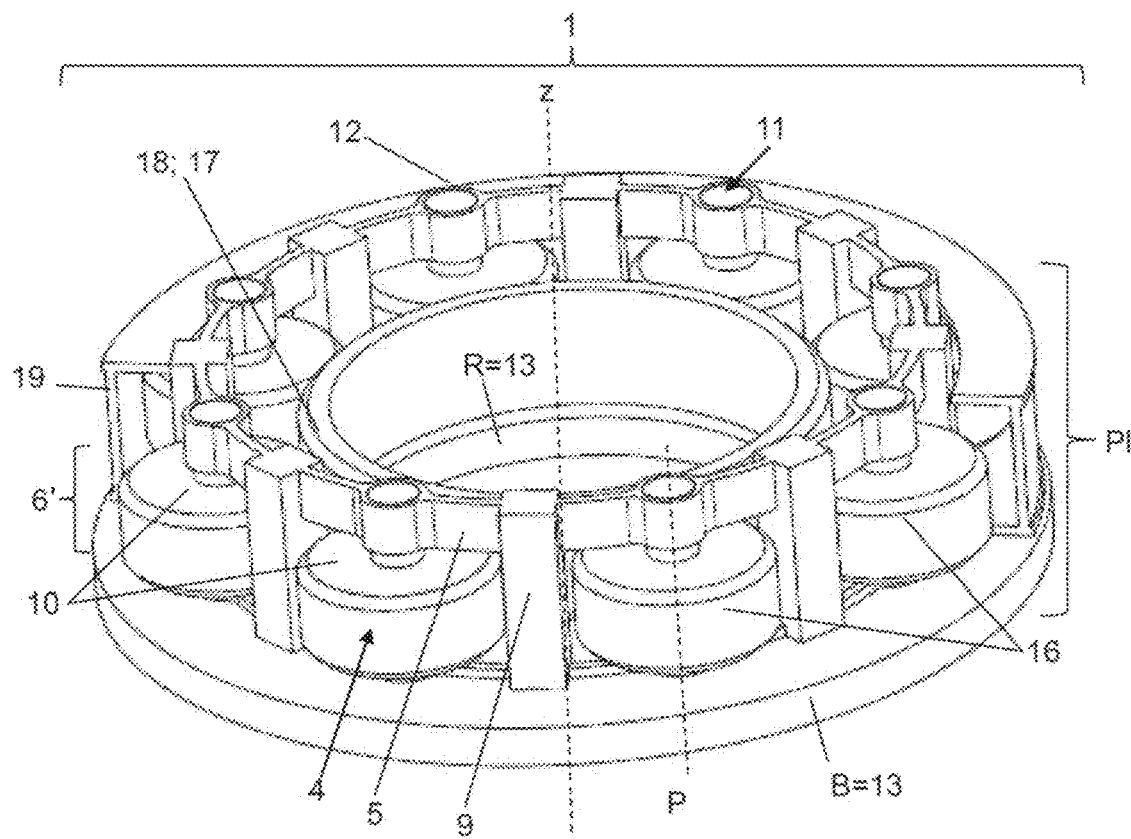
FIG. 5c shows a perspective view of the fifth preferred embodiment of the drive unit according to the invention without gear mechanism housing.

FIG. 5c shows a perspective view of the fifth preferred embodiment of the drive unit 1 according to the invention without gear mechanism housing, central drive shaft and outer mast. As can be seen in FIG. 5c, the planet wheel carrier 5 is here connected in a rotationally fixed and positionally fixed manner to a base element B functioning as bearing mast 13 via the carrier arms 9. In addition, the bearing mast 13 here comprises a pipe element R, which is arranged centrally and coaxially to the central axis z, for a further shaft, which is fastened on the annular gear 18.

In addition, it can be seen in FIG. 5c that here the planet wheel carrier 5 is configured as a single coherent substantially annular component, in which the planetary gears 4 are held in a positionally fixed manner.

Figure 5D:
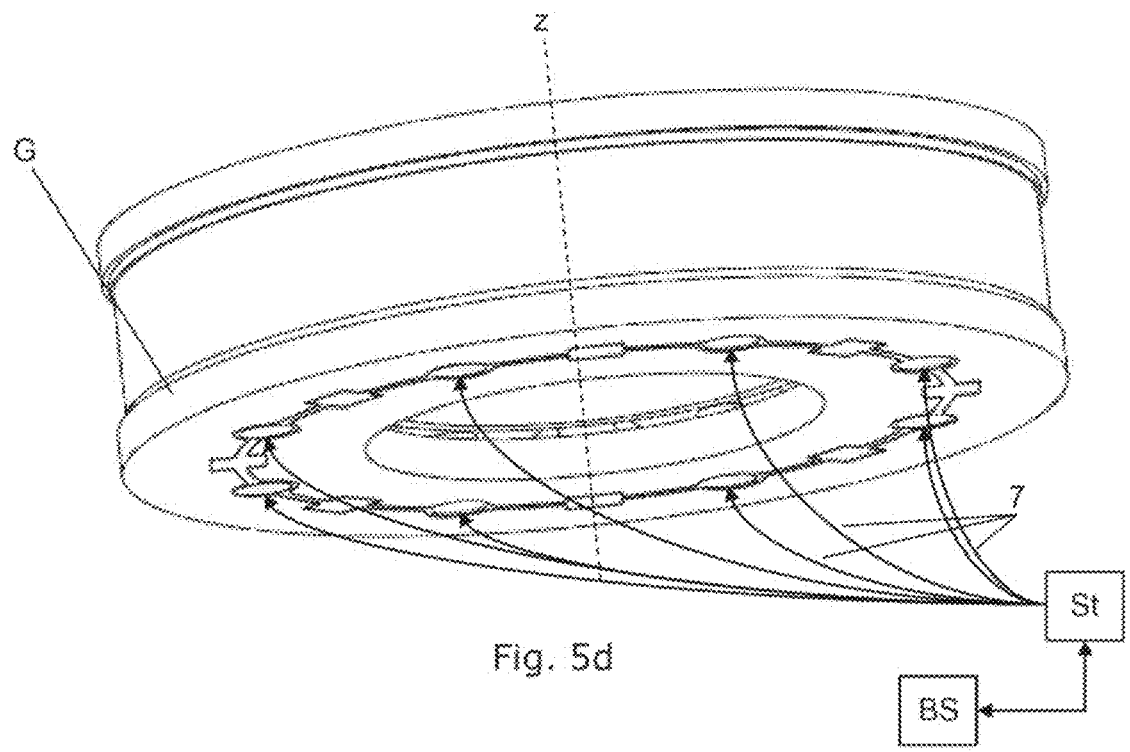
FIG. 5d shows a perspective view of the fifth preferred embodiment of the drive unit according to the invention with gear mechanism housing.

FIG. 5d shows a perspective view of the fifth preferred embodiment of the drive unit 1 according to the invention with gear mechanism housing G, but without central drive shaft and without outer mast. As can be seen in FIG. 5d, the carrier arms 9 are at the same time used for fastening the gear mechanism housing G.

The fifth preferred embodiment of the drive unit 1 according to the invention shown in FIGS. 5a to 5d has a particularly compact design, in which the attachable rotating outer mast 14 can be configured in such a shortened manner on the externally toothed annular gear 18 or on the internally toothed annular gear 19, that the same can be attached essentially at the same axial position as the planetary gears 4. In the case of the use for a rotary wing aircraft, the drive unit 1 would be attachable fundamentally directly in the rotor plane.

Figure 6:
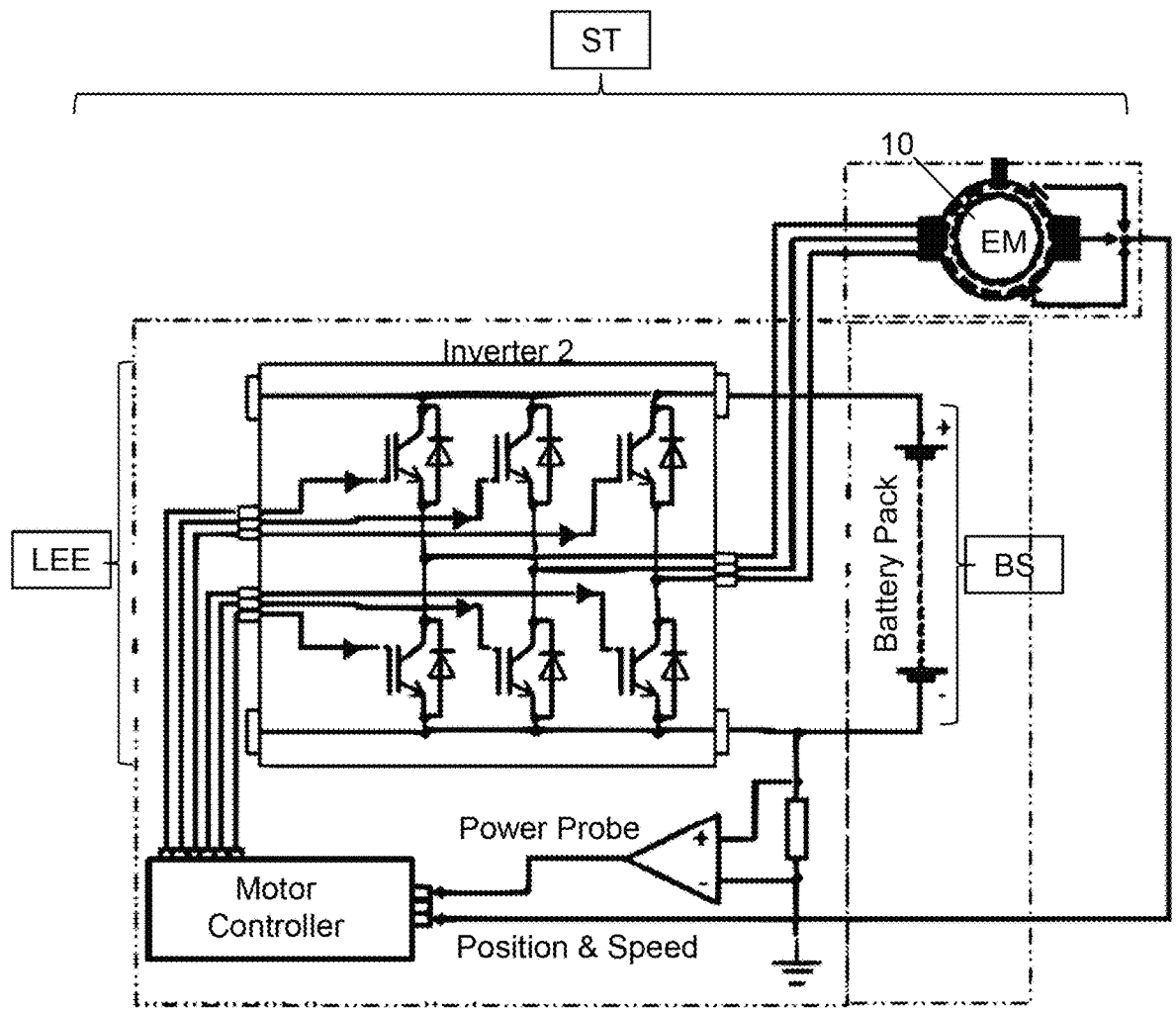
FIG. 6 shows a functional block diagram of the drive power control of the first drives, which are integrated into the planetary gears, of the preferred embodiments of the drive unit according to the invention.

FIG. 6 shows a functional block diagram of the drive power control of the first drives 2 integrated in the planetary gears P.

As can be seen by way of example in FIGS. 1d, 2d, 3d, 4d and 5d, the drive unit 1 comprises a control unit ST, which is configured so as to operate and to synchronize the first drives 2 integrated in the planetary gears 4 with one another.

In the sense of the present invention, the control is realized as a standard control for electric synchronous motors 10 with control logic and power electronics unit LEE (also termed "inverter" here). The control logic (also termed "motor controller" here) produces the corresponding signals which control the inverter, which then excites the corresponding motor coils of the electric synchronous motor 10, in order to obtain a continuous rotation with defined rotational speed and torque. The synchronization of the electric synchronous motors 10 is enabled by determining the position and the rotational speed of the armature and for each electric synchronous motor 10 individually by calculating the control signals.

REFERENCE LIST

1 Drive unit
2 First drive
4 Planetary gear
5 Planet wheel carrier
6; 6' Lower/upper planet wheel
7 Electrical supply lines
9 Carrier arms (for fastening the planet wheel carrier 5 on the gear mechanism housing G)
10 Electric synchronous motor
11 Inner rotor part (of the electric synchronous motor)
12 Stator part
13 Bearing mast
14 Outer mast
15 Shaft
16 Outer rotor part (of the electric synchronous motor)
17 Sun wheel
18 (Inner, externally toothed) annular gear
19 (Outer, internally toothed) annular gear
20 Annular-gear driver
24 Central drive gear
25 Drivetrain
26 Drivetrain gear
27 Central drive shaft
30 Torque transmitter gear mechanism
B Base element
BS Battery storage unit
G Gear mechanism housing
M Magnetic gap
P Planet wheel axis
Pl Planetary gear mechanism
R Tube element
S Pin-shaped element
ST Control unit
V Connecting elements
W Windings (of the stator part)

We claim:

1. A drive unit for driving a main rotor of a rotary wing aircraft, comprising:
a gear mechanism, wherein the gear mechanism comprises a plurality of gears, wherein each gear has at least one planet wheel with toothing and the gears are arranged concentrically to a central axis inside the gear mechanism, so that a rotatable shaft of the rotary wing aircraft can be driven by the gears or a sun wheel, wherein
a first drive is integrated into at least one gear, as a result of which an inner drive is formed inside the gear mechanism, and
the planet wheels are mounted in a fixed position such that the planet wheels can rotate about respective planet wheel axes.

2. The drive unit of claim 1, wherein the first drive is configured as an electric motor that can be regulated electrically with regards to rotational speed and torque.

3. A hybrid drive comprising the drive unit of claim 1, wherein the first drive is mechanically coupled to a second drive, which is configured as a thermodynamic engine or as an electric drive and is located outside of the gear mechanism.

4. A drive unit for driving a main rotor of a rotary wing aircraft, comprising:
a gear mechanism, wherein the gear mechanism comprises a plurality of gears, wherein each gear has at least one planet wheel with toothing and the gears are arranged concentrically to a central axis inside the gear mechanism, so that a rotatable shaft of the rotary wing aircraft can be driven by the gears or a sun wheel, wherein
a first drive is integrated into at least one gear, as a result of which an inner drive is formed inside the gear mechanism,
wherein the first drive is configured as an electric motor that can be regulated electrically with regards to rotational speed and torque, and
wherein the electric motor is an electric synchronous motor with an internal rotor part.

5. A drive unit for driving a main rotor of rotary wing aircraft, comprising:
a gear mechanism, wherein the gear mechanism comprises a plurality of gears, wherein each gear has at least one planet wheel with toothing and the gears are arranged concentrically to a central axis inside the gear mechanism, so that a rotatable shaft of the rotary wing aircraft can be driven by the gears or a sun wheel, wherein
a first drive is integrated into at least one gear, as a result of which an inner drive is formed inside the gear mechanism, and
wherein the first drive is an electric drive, wherein the at least one gear comprises a stationary stator part, a rotatable rotor part and the at least one planet wheel with toothing fastened indirectly or directly on the rotor part and the gear is held in an operatively connected manner with the sun wheel and/or the rotatable shaft by means of planet wheel carriers inside the gear mechanism.

6. A rotary wing aircraft comprising:
a hybrid drive unit comprising:
a drive unit for driving a main rotor of the rotary wing aircraft, comprising:
a gear mechanism, wherein the gear mechanism comprises a plurality of gears, wherein each gear has at least one planet wheel with toothing and the gears are arranged concentrically to a central axis inside the gear mechanism, so that a rotatable shaft of the rotary wing aircraft can be driven by the gears or a sun wheel, wherein
a first drive is integrated into at least one gear, as a result of which an inner drive is formed inside the gear mechanism, and wherein the first drive is mechanically coupled to a second drive, which is configured as a thermodynamic engine or as an electric drive and is located outside of the gear mechanism.

7. The rotary wing aircraft of claim 6, wherein the first drive is mechanically coupled to the second drive which is configured as the thermodynamic engine, and is in mechanical operative connection, so that the first drive and the second drive are coupled by means of the gear mechanism, the electric first drive can support the second drive with driving a main rotor and/or a tail rotor of the rotary wing aircraft, and as a result, the hybrid drive is formed.

8. A rotary wing aircraft comprising:
a drive unit for driving a main rotor of the rotary wing aircraft, comprising:
a gear mechanism, wherein the gear mechanism comprises a plurality of gears, wherein each gear has at least one planet wheel with toothing and the gears are arranged concentrically to a central axis inside the gear mechanism, so that a rotatable shaft of the rotary wing aircraft can be driven by the gears or a sun wheel, wherein
a first drive is integrated into at least one gear, as a result of which an inner drive is formed inside the gear mechanism.

9. The rotary wing aircraft of claim 8, wherein the first drive is configured and dimensioned in such a manner that a main rotor and/or a tail rotor of the rotary wing aircraft can be driven autonomously without an additional drive.

10. The rotary wing aircraft of claim 8, wherein the rotatable shaft is a rotor shaft of the rotary wing aircraft, wherein the rotor shaft is configured to be two-part and comprises a bearing mast and an outer mast, wherein the outer mast is configured as a hollow body and mounted rotatably about the central axis relative to the bearing mast, concentrically surrounding the bearing mast, and wherein the outer mast can be operatively connected to a rotor gear mechanism, which is configured as a gear mechanism, wherein the bearing mast can be mounted in a fixed position and in a rotationally fixed manner in the rotary wing aircraft, so that the outer mast can be coupled to a main rotor in a rotationally fixed manner and can be set rotating using the rotor gear mechanism, which is configured as a gear mechanism.

11. The rotary wing aircraft of claim 10, wherein the rotor shaft can be coupled in a rotationally fixed manner to a drive gear, wherein the drive gear can be rotatably mounted on the bearing mast by means of at least one radial bearing, and a rotation of at least one lower planet wheel on a side of a respective planet wheel carrier facing the drive gear about a respective planet wheel carrier can be achieved by means of a central sun wheel, which is connected in a rotationally fixed manner to the drive gear, and wherein at least one upper planet wheel, which is mounted fixed in place and belongs to the at least one lower planet wheel, is surrounded by an internally toothed annular gear, which can be rotated about the central axis, and an annular-gear driver, which functions as a force-transmission device, can be attached or is moulded on between the internally toothed annular gear and the outer mast in such a manner that starting from a rotational movement of the drive gear, the outer mast and the main rotor, which is coupled to the outer mast in a rotationally fixed manner, can be set rotating.

12. The rotary wing aircraft of claim 8, wherein the drive unit comprises a battery storage unit, a control unit, and wherein the first drive is in the form of an electric drive in a rotationally-fixed coupled state between the first drive and a second drive, which is configured as a thermodynamic engine, and during an operation of the second drive, the electric drive can function as a generator for an additional energy recovery for the battery storage unit.

13. The rotary wing aircraft of claim 12, wherein a rectifier is provided in the electric drive, as a result of which the battery storage unit can be charged when the electric drive is not operating.

14. The rotary wing aircraft of claim 12, wherein the control unit is configured to allow an automatic change of mode between torque generation for driving the first drive and additional energy recovery for the battery storage unit.

* * * * *